United States Patent [19]

Jindrick et al.

[11] 4,419,619

[45] Dec. 6, 1983

[54] MICROPROCESSOR CONTROLLED VOLTAGE REGULATING TRANSFORMER

[75] Inventors: James A. Jindrick, Racine; James R. Hurley, Brookfield; Clyde Gilker; Naresh K. Nohria, both of Milwaukee; James A. Baranowski, Oak Creek; Thomas G. Dolnik, Kenosha, all of Wis.

[73] Assignee: McGraw-Edison Company, Rolling Meadows, Ill.

[21] Appl. No.: 303,608

[22] Filed: Sep. 18, 1981

[51] Int. Cl.³ .............................. G05F 1/20; G05F 1/30
[52] U.S. Cl. ...................................... 323/257; 307/31; 340/646; 323/263; 364/483
[58] Field of Search ............... 323/256, 216, 257, 260, 323/263; 340/646, 659, 661; 361/82; 364/483; 307/31, 32

[56] References Cited

U.S. PATENT DOCUMENTS

| | | |
|---|---|---|
| 2,009,383 | 7/1935 | Blume . |
| 2,280,766 | 4/1942 | Bronaugh . |
| 2,381,271 | 8/1945 | Farmer . |
| 2,713,142 | 7/1955 | Sealey . |
| 3,422,343 | 1/1969 | Specht et al. .................... 323/205 |
| 3,673,425 | 6/1972 | Plichta .............................. 307/127 |
| 3,855,503 | 12/1974 | Ristuccia ........................... 340/646 |
| 4,323,838 | 4/1982 | Pettigrew ........................... 323/256 |

OTHER PUBLICATIONS

Electr. Power & Energy Syst., (G.B.), vol. 3, No. 2, pp. 75–83, Apr. 1981, S 17110012.
Omnitopics, "ML-32 Voltage Regulator", Dec. 1972.
McGraw-Edison Co., Power System Group Catalog, Section R-225-10-1, dated 4/70.

*Primary Examiner*—William H. Beha, Jr.
*Attorney, Agent, or Firm*—James A. Gabala; Jon C. Gealow; Charles W. MacKinnon

[57] ABSTRACT

A voltage regulating transformer utilizing a microprocessor and a versatile multipurpose set of hardware modules and software modules it is described. A standard tap changing mechanism is driven in response to an analog control signal to change the output voltage of the transformer in response to digitally sampled values of voltage and current which have been transformed from the time domain to the frequency domain through a software program using Fourier transform techniques. The output current is also transformed and digitally processed to determine the power factor and the direction of power flow through the transformer. By inserting the digital values of the line characteristics to the load, line drop compensation is provided for. The difference in voltage across the input and output transformers is transformed to a digital signal and internally processed to provide an indication of the position of the tap changing mechanism without relying upon mechanical devices. The various software and hardware modules are designed so as to be readily utilizable in other electrical distribution controls.

23 Claims, 47 Drawing Figures

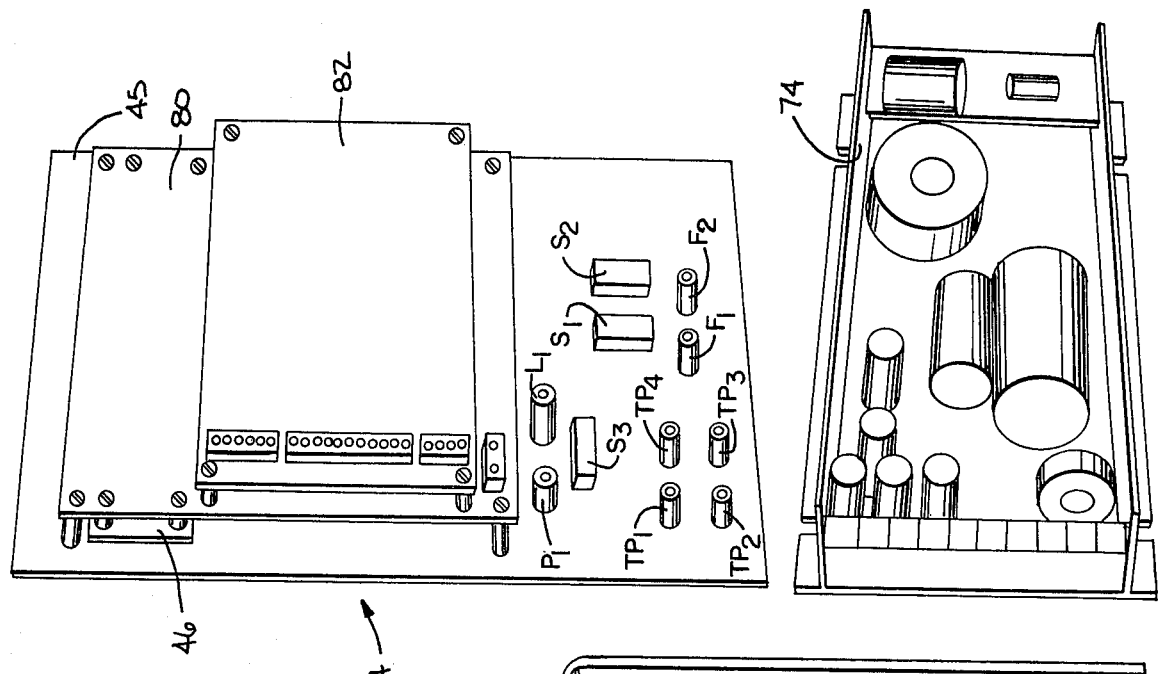
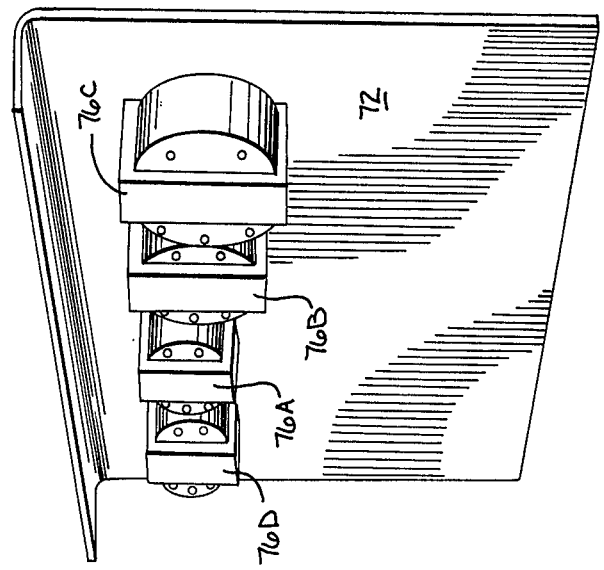
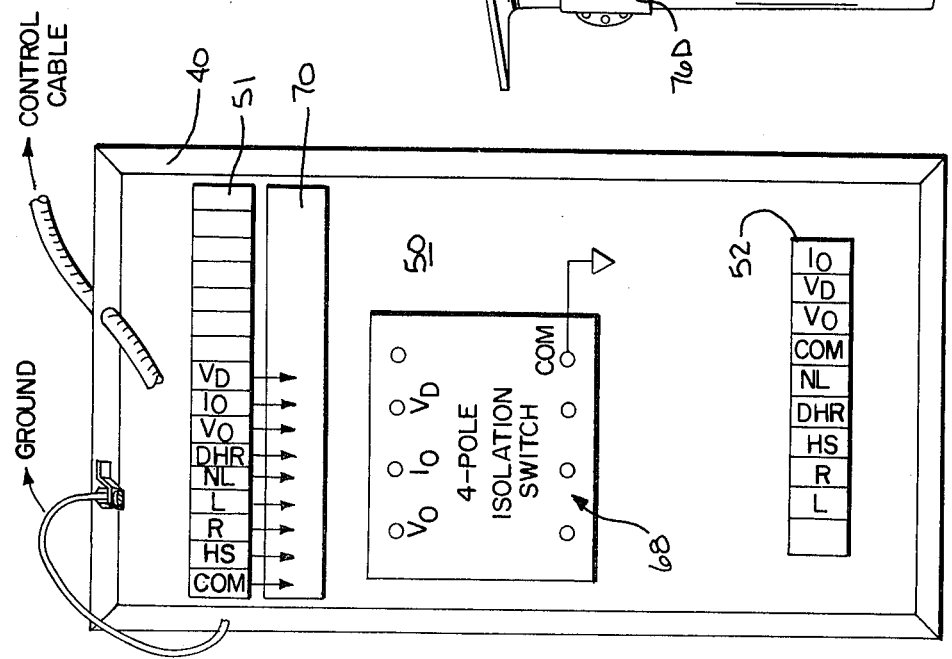
FIG.1C

| FUNCTION | TURN DISPLAY ON/OFF |
|---|---|
| SECURITY LEVEL REQUIRED | NONE |

| PRESS KEY | DISPLAYED INFORMATION |
|---|---|
| ON/OFF | Func. |
| ON/OFF | |

FIG.3A

| FUNCTION | EXAMINE VOLTAGE OUT |
|---|---|
| SECURITY LEVEL REQUIRED | NONE |

| PRESS KEY | DISPLAYED INFORMATION |
|---|---|
| VOLTAGE OUT | 123.4 |
| CLEAR | Func. |

FIG.3B

| FUNCTION | EXAMINE DIFFERENTIAL VOLTAGE |
|---|---|
| SECURITY LEVEL REQUIRED | NONE |

| PRESS KEY | DISPLAYED INFORMATION |
|---|---|
| FUNCTIONS | CodE__ |
| 1 | CodE_1 |
| 2 | CodE 12 |
| ENTER | (PRESENT VALUE) |
| CLEAR | Func. |

FIG.3C

| FUNCTION | ENTER SECURITY CODE |
|---|---|
| SECURITY LEVEL REQUIRED | NONE |

| PRESS KEY | DISPLAYED INFORMATION |
|---|---|
| FUNCTIONS | CodE__ |
| 9 | CodE_9 |
| 9 | CodE99 |
| ENTER | ---- |
| (FIRST DIGIT) | ---- |
| (SECOND DIGIT) | --- |
| (THIRD DIGIT) | -- |
| (FOURTH DIGIT) | - |
| (FIFTH DIGIT) | |
| ENTER | Func. |

FIG. 3D

| FUNCTION | EXAMINE / CHANGE VOLTAGE |
|---|---|
| SECURITY LEVEL REQUIRED | EXAMINE: NONE / CHANGE: 1 OR 2 |

| PRESS KEY | DISPLAYED OPERATION |
|---|---|
| SET VOLTAGE | (PRESENT VALVE) |
| CHANGE | ---.- |
| 1 | ---.1 |
| 2 | --1.2 |
| 3 | -12.3 |
| 4 | 123.4 |
| ENTER | (VALUE BLINKS) |
| | 123.4 |
| CLEAR | Func. |

FIG. 3E

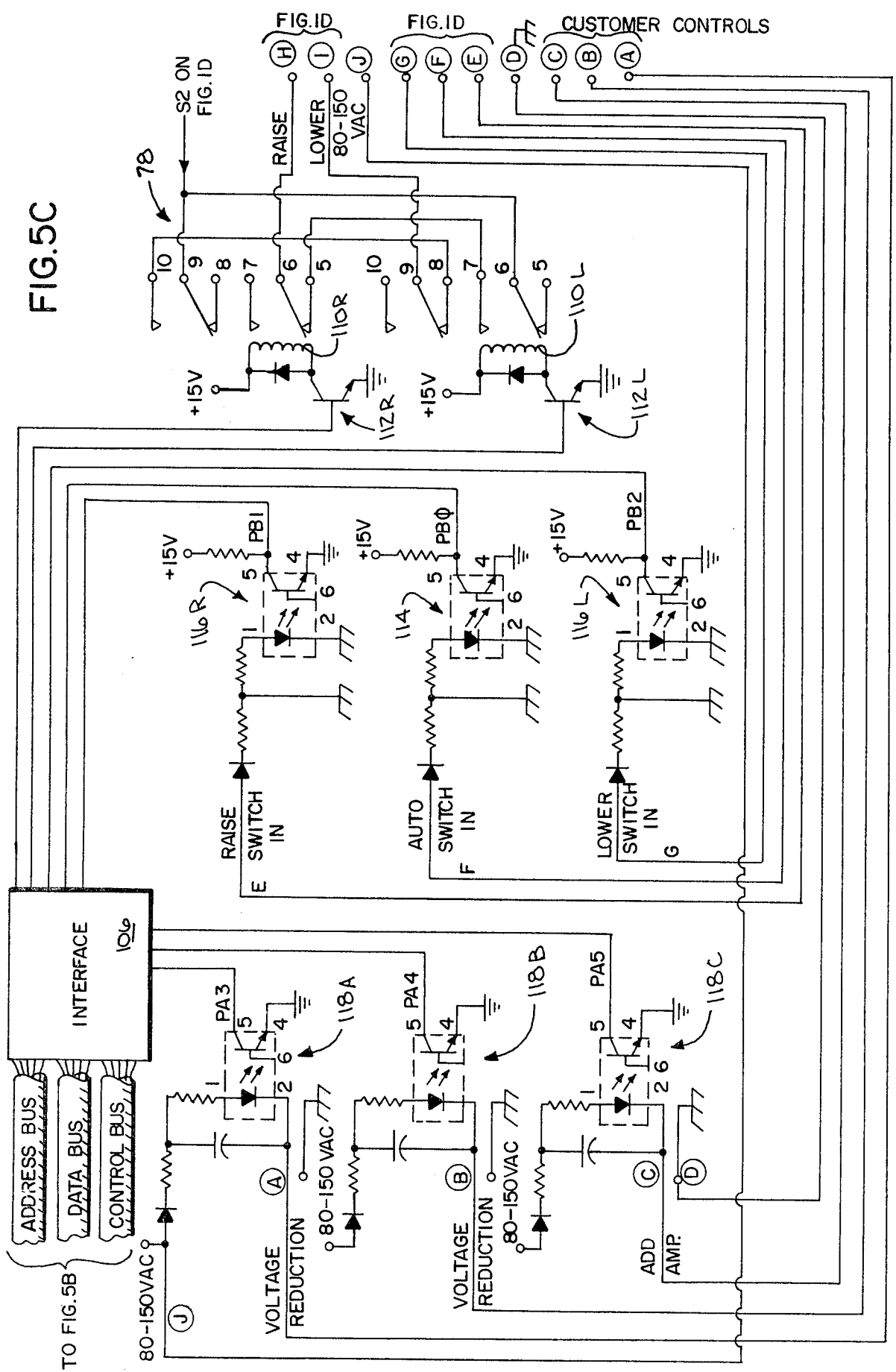

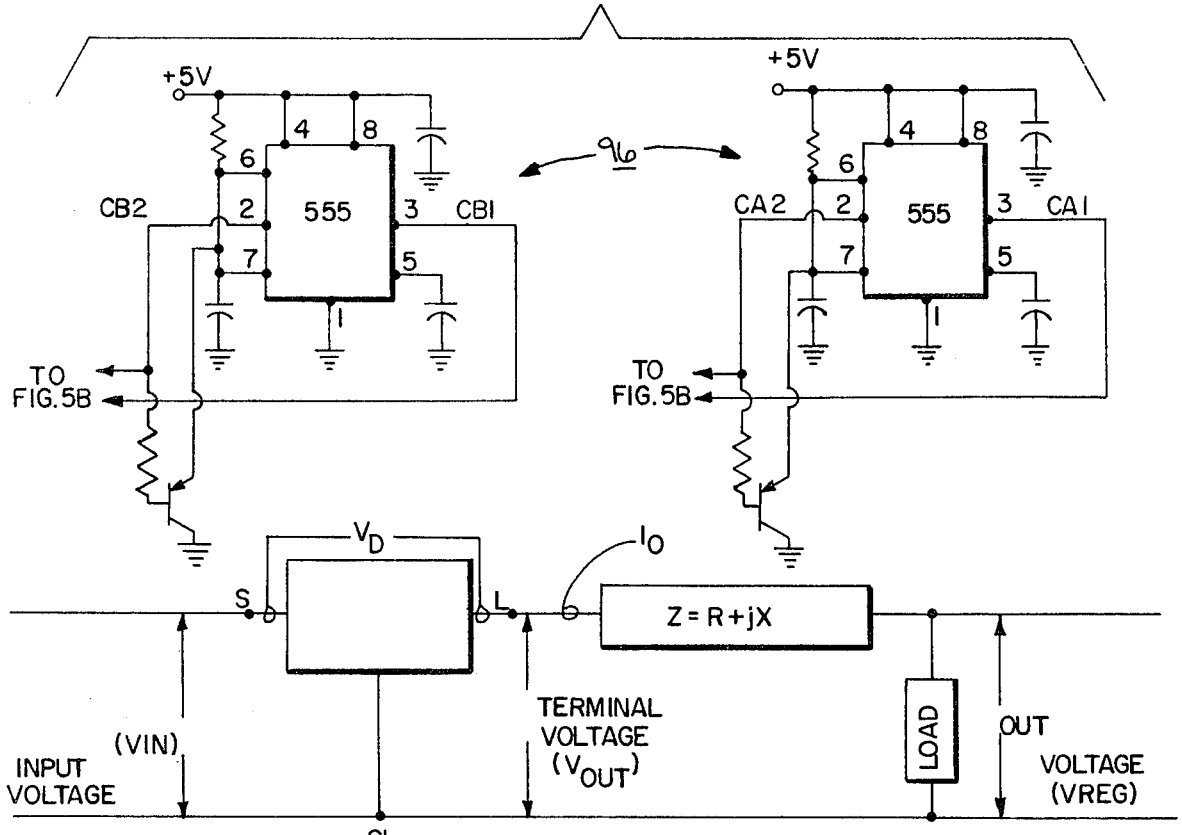
FIG. 5E
FIG. 6A
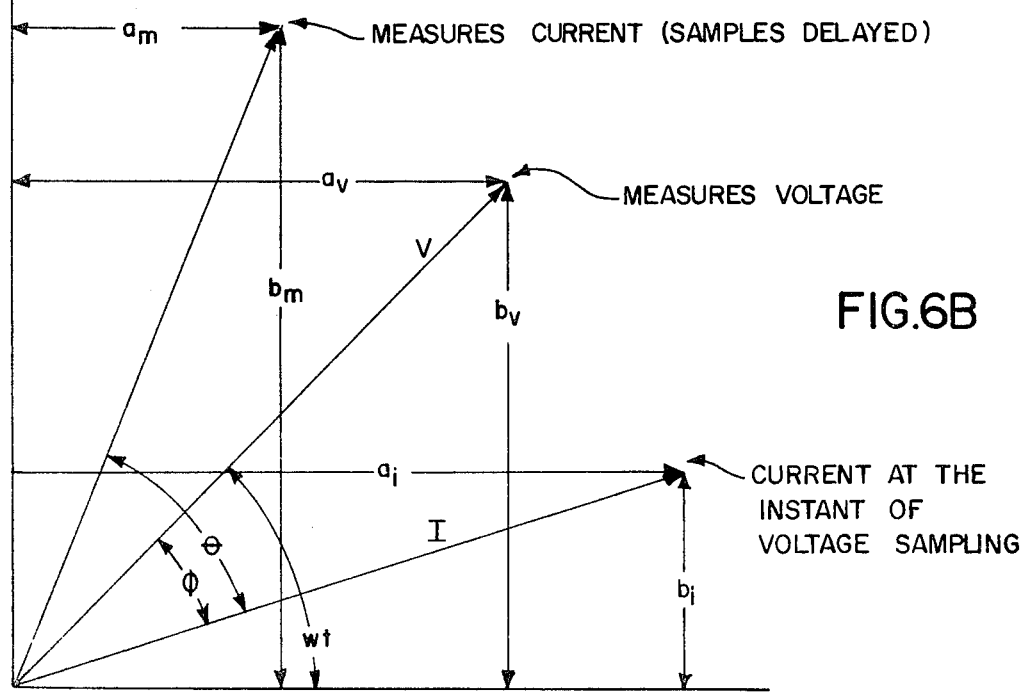
FIG. 6B

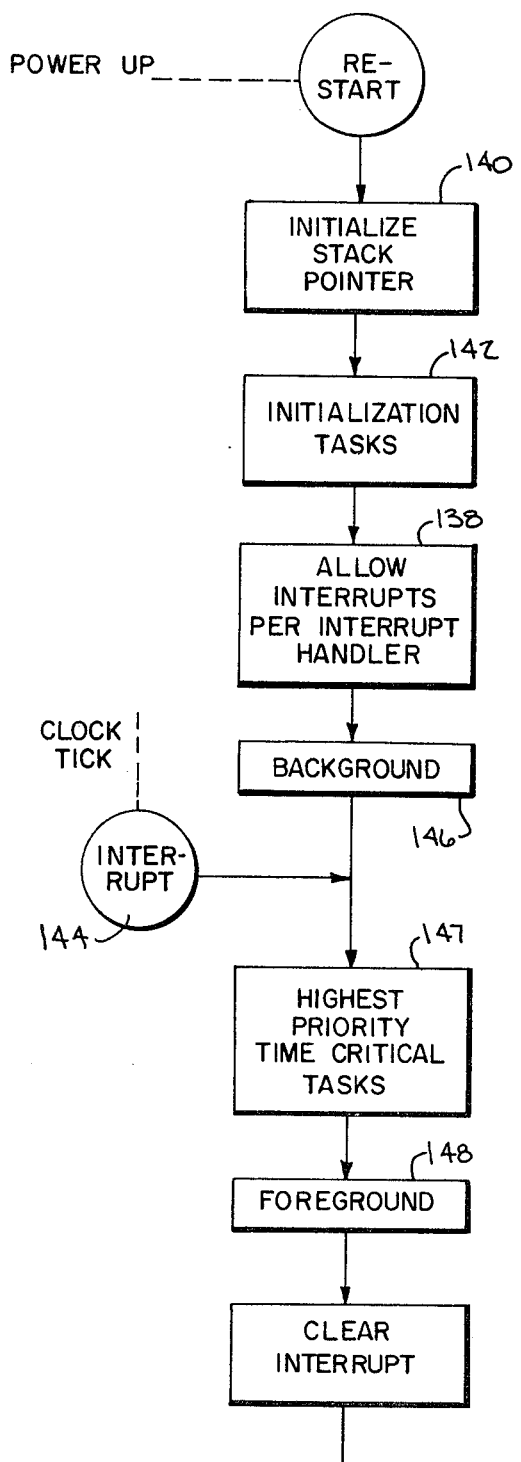
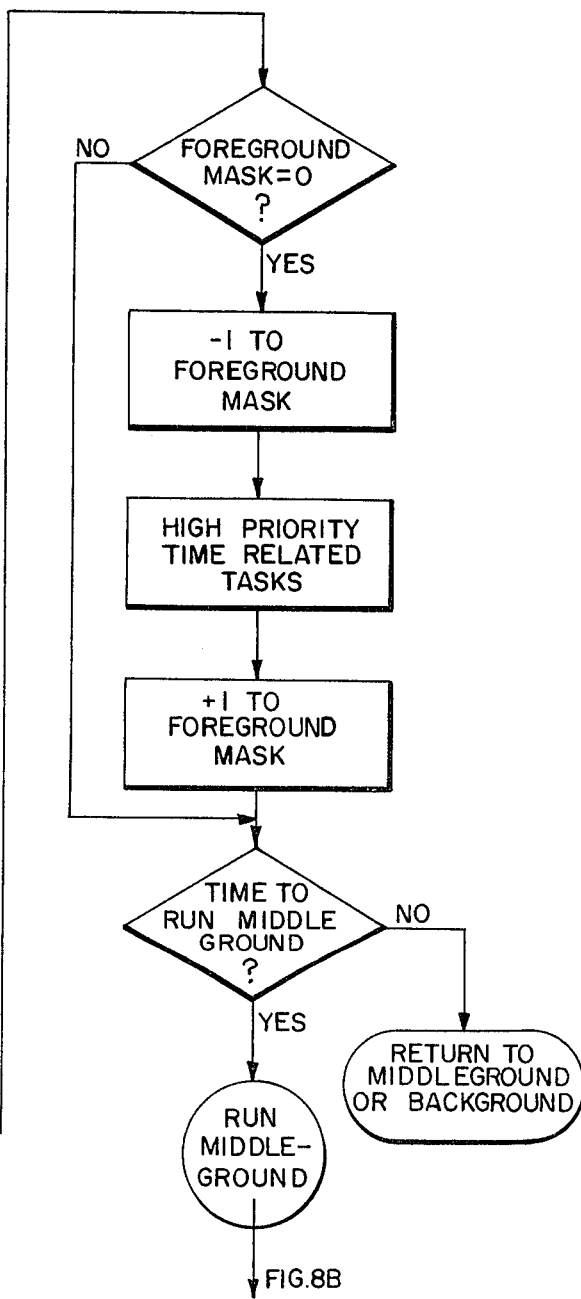
FIG.8A

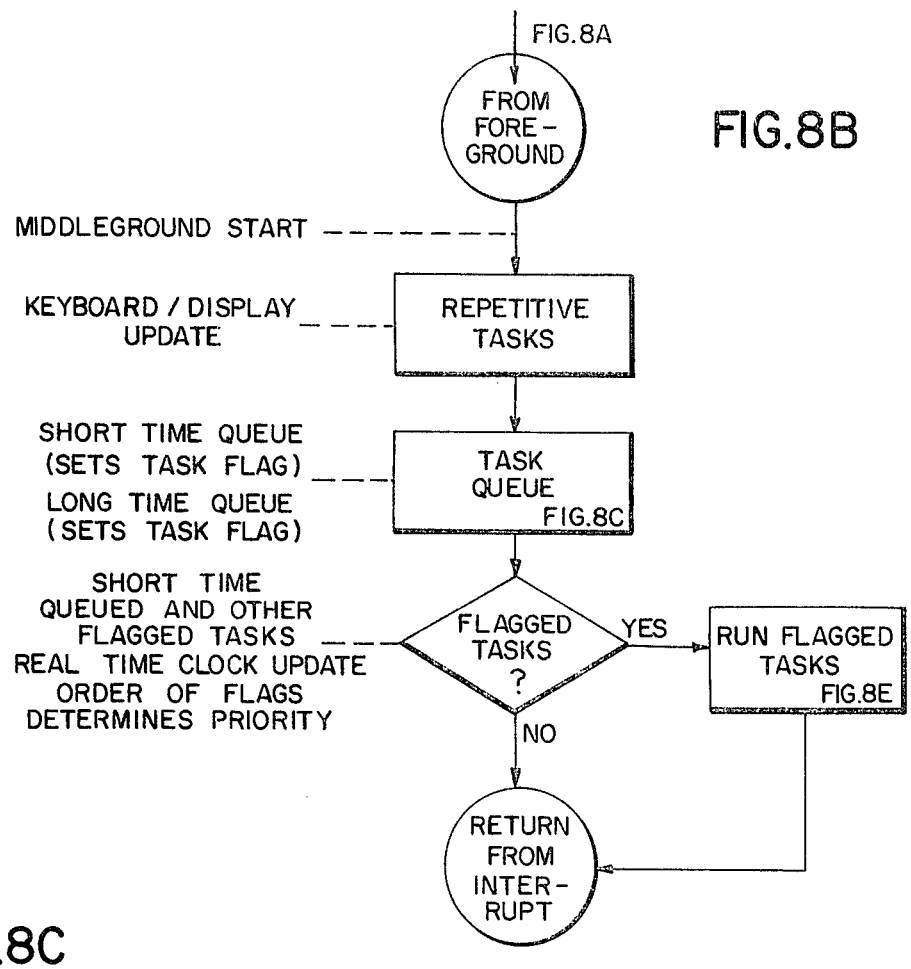
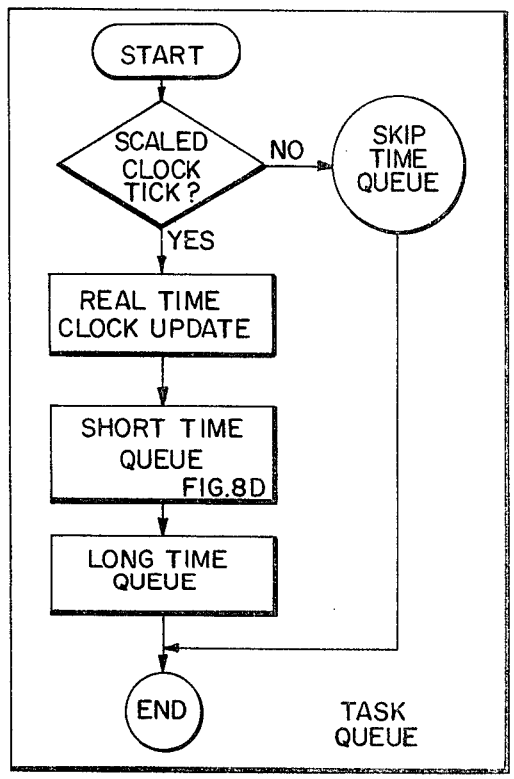
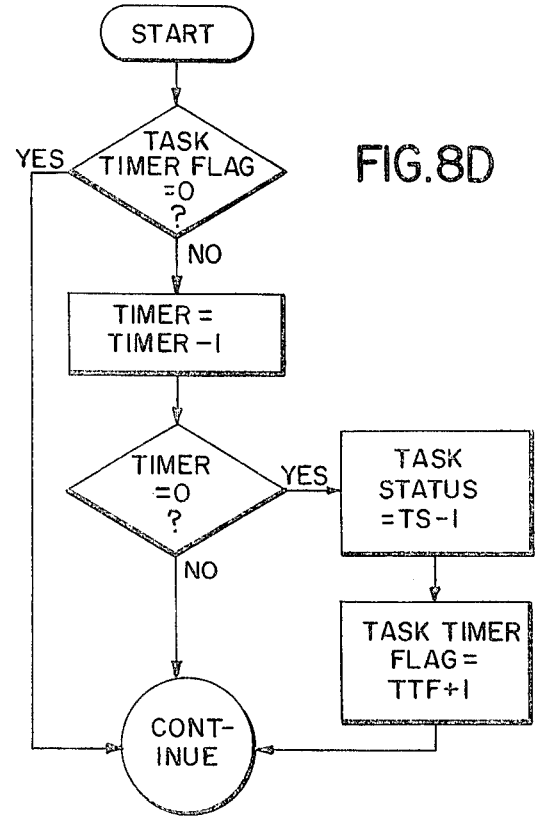

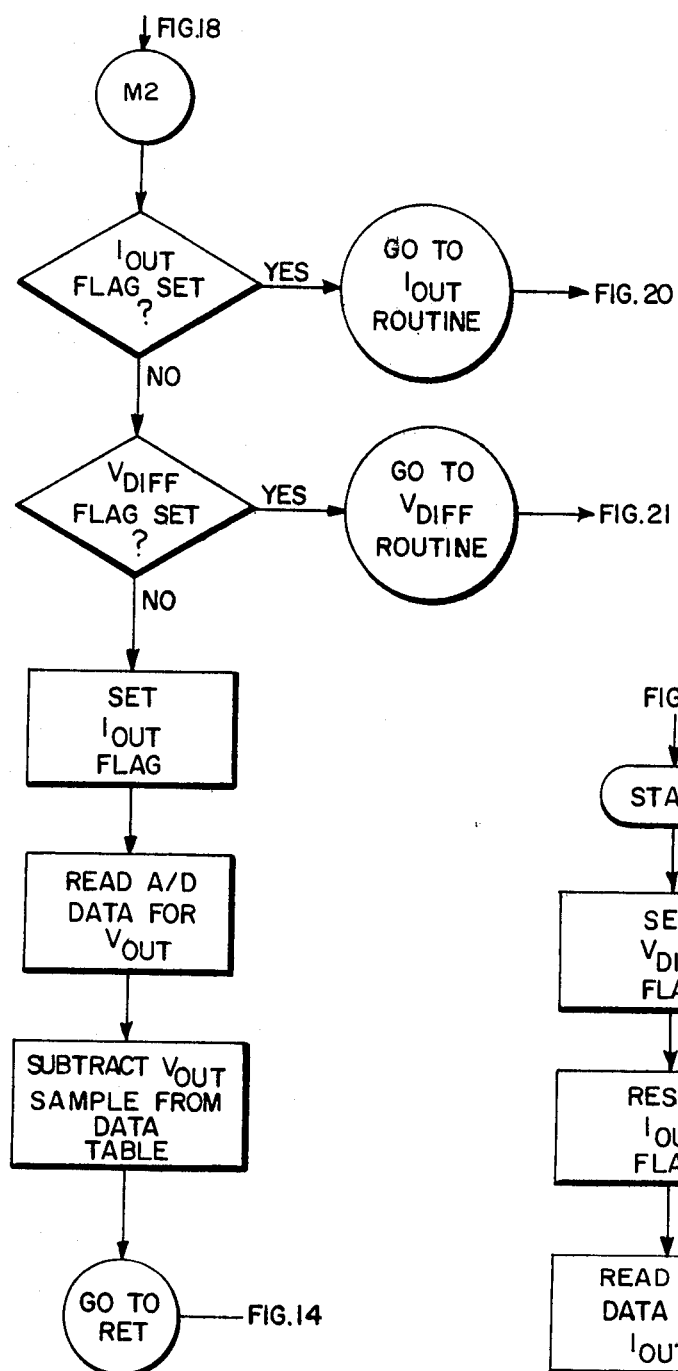
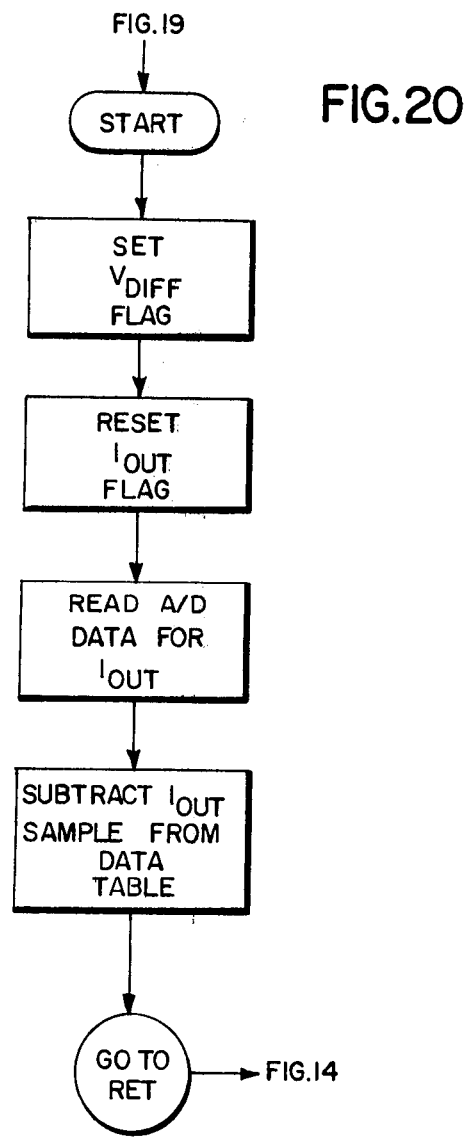
FIG.19
FIG.20

MICROPROCESSOR CONTROLLED VOLTAGE REGULATING TRANSFORMER

TECHNICAL DESCRIPTION

This invention generally relates to voltage regulating transformers and, in particular, to a control using a microprocessor adapted to operate the tap changing mechanism of a distribution transformer.

BACKGROUND OF INVENTION

There have been five dramatic leaps in electronic technology during the past hundred years. The first four include the light bulb, electron tube, transistor, and integrated circuit. The most recent jump, and perhaps the most significant, has been the emergence of the microprocessor in the 1970's and 1980's. A microprocessor and associated memory and interfacing components form a "microcomputer", a physically small digital machine as powerful as a room-sized computer of only two decades ago. These microcomputers have found almost limitless applications from electronic games, calculators, microwave ovens, and point of sale terminals, to traffic signals, automobile ignition controls, copying machine controls, and deep space probes. The microcomputer has been a leading factor in the proliferation of automated processing controls including industrial robots. However, there have been few microprocessor applications to electric power transmission and distribution systems. In particular, there has been nothing comparable to automated control of the protective and operating apparatus used on power systems. The emergence of the microcomputer provides the technical capability provided the specialized nature of electrical power distribution systems and their controls is fully understood.

In most electrical power distribution systems the voltage level would tend to vary due to several factors such as load, line inductance, or line resistance. This variation is disagreeable to the customer since it could result in poor performance or even equipment damage. A step-voltage regulating transformer is a device which is often used to maintain the voltage of an electrical distribution system or network relatively constant. The voltage is maintained relatively constant by an apparatus which: (1) detects changes in the system voltage; and (2) automatically adjusts system voltage without interrupting service. An early step voltage regulating transformer is disclosed by Sealey in U.S. Pat. No. 2,713,142.

For the most part, voltage regulating transformers are tapped autotransformers consisting of: a tapped series winding that facilitates plus or minus 10% regulation; a shunt winding across the regulator output terminals; a potential or voltage sensing winding closely coupled to the shunt winding; and a current transformer primary winding in the load line at the output terminal. A reversing switch is also provided which is always in a neutral position or a "raise" or a "lower" position, depending on whether the regulator is used to boost or buck the source voltage. The reversing switch is disposed across the ends of the series winding. Under this arrangement with the reversing switch in the raised position, the series winding becomes additive with respect to the shunt winding as the number of turns placed in series with the load increases. Therefore, the amount of voltage boost increases. When the reversing switch is moved to the lower position, the series windings, therefore, become subtractive with respect to the shunt winding and the amount of voltage buck depends upon the number of turns placed in series with the line.

Typically, an automatic control device is provided to change the tap settings. For the most part, these automatic controllers are not responsive to voltage changes due to current flowing both into and out of the input terminals of the transformer. Those skilled in the art know that in the case of multiple feed systems or feed systems employing alternate power sources, it is possible for a reverse power flow to occur. Unless the automatic voltage regulating portion of a transformer is arranged to be responsive to current flowing in either direction, instability is likely to occur. The traditional solution to this problem was to use a separate potential transformer across the input terminals of the regulating transformer and to use it to sense changes in the direction of current flow. those skilled in the art know that those control devices, for the most part, are electromechanical in nature, are difficult to adjust and maintain in alignment, and relatively expensive to produce, especially if they are to have a reverse current or reverse power sensing capability. The mechanism described by U.S. Pat. Nos. 2,280,766; 2,009,383; and 2,381,271 are representative of voltage regulating transformers totally using electromechanical devices for control.

Bearing in mind the recent and dramatic progress that has been made with the use of microprocessors, a modern voltage regulating transformer design is long overdue. A relatively inexpensive control which can be readily adapted to existing distribution transformer voltage regulating designs in such a manner that the automatic regulating circuitry of the device includes the capability of sensing voltage changes due to current flowing both into and out of the transformer output terminals would be welcomed by both electrical utilities and their customers. Preferably, existing proven autotransformer windings and tap changing mechanisms should be used to the maximum extent practicable. Such a voltage regulating transformer design would not only reduce the overall cost of manufacture, but also the operating cost of maintaining the transformer throughout its life. Moreover, if such a control incorporates modern, digital communicating schemes, the capability would be provided for electrical utilities to automate their distribution systems and in the process improve the systems overall efficiency. Under this arrangement, a master substation computer could send signals automatically throughout the distribution system to the digitally controlled equipment. Since each voltage regulating transformer uses a self-sufficient microprocessor or microcomputer, the intelligence of such an automated distribution system is dispersed and close to the source of problems and customer requirements.

SUMMARY OF THE INVENTION

In accordance with the present invention, a voltage regulating transformer is disclosed which utilizes a microprocessor to control the voltage taps of an auto transformer so as to maintain the output voltage generally equal to a preset or reference RMS voltage value. In particular, the voltage regulating transformer includes: a first winding which defines a first plurality of turns and which has an associated input terminal adapted to be connected to a source of A.C. voltage; a second winding which is electromagnetically coupled to the first winding and which defines a second plurality of turns and which has an associated output terminal; a tap changer or changing means, preferably operated in response to an analog control signal, for changing the ratio of turns through which current flows in the first winding and the second winding; a voltage output signaling means which produces a plurality of digital voltage signals representative of the instantaneous A.C. voltage at the output terminal; a digital input means which establishes a reference digital voltage signal representative of the RMS voltage to be maintained at the output terminal of the transformer; a digital computer, preferably using a microprocessor, for transforming the digital voltage signals produced by the voltage output signaling means from the time domain to the frequency domain to obtain a measured digital voltage signal representative of the RMS voltage at the output terminal of the transformer and for generating a digital control signal representative of the difference between the measured digital voltage signal and the reference digital voltage signal; and means for converting the digital control signal to an analog control signal to operate the tap changer.

Preferably, the voltage regulating transformer also includes: a current output signaling means for producing digital current signals representative of the instantaneous A.C. current flowing through the output terminal; means for transforming the digital current signals from the time domain to the frequency domain to obtain a measured digital current signal representative of the RMS current flowing through said output terminal; and means for processing the measured digital signals of current and voltage to produce a digital signal representative of the phase angle relationship of the instantaneous A.C. current and voltage at the output terminal. When these devices are included, the power factor relationship between the instantaneous current and voltage is established. In addition, the direction of power flow across the first winding and the second winding is established by examining the algebraic sign of the product of the instantaneous voltage, the instantaneous current, and the power factor relationship between the voltage and the current. Thus, the transformation of instantaneous A.C. voltage and current signals from the time domain to the frequency domain provides a means for determining the direction of power flow through the transformer.

Finally, by including a differential voltage signaling means for producing a plurality of digital differential voltage signals representative of the instantaneous voltage difference across the input and output terminals and by transforming these digital differential voltage signals from the time domain into the frequency domain, a digital differential voltage signal is produced which is representative of the RMS voltage measured between the input and output terminals. Since the difference in voltage across the input and output terminals is representative of the position of the tap changing mechanism, a digital control signal is obtained which represents the relative position of the tap changing means. This is effectively a feed-back signal to the control system. Thus, by simply measuring voltages and currents at the output terminal and the voltage difference between the input and the output terminals and by digitally processing these electrical parameters, a control signal is produced for changing or controlling the position of the tap changing mechanism without using direct reading position sensors such as limit switches which require frequent adjustment and calibration.

Once it is understood that digital signals within the microprocessor computer are readily adaptable to other uses, and once it is understood that additional control signals and monitoring methods are available and are readily adaptable to a microprocessor controller, a digitally controlled voltage regulating transformer can be readily modified to meet or to produce these functions (i.e. line drop compensation) at very little cost relative to conventional analog controls and electromechanical design methods. In addition, the basic elements of the invention are designed to be readily adaptable to other power system control requirements. Thus, the apparatus can be viewed as a series of microprocessor based software and hardware modules which are suitable for use in other electrical power distribution and control applications. This concept maximizes the effectiveness and flexibility of microprocessors in meeting present and future control requirements.

The modular approach has many practical advantages. In particular, operating features are automatically incorporated into every control, including: simplified servicing techniques; remote communications capabilities with programmable protocols; and "watch-dog" timers. In addition, all control panels would operate in the same way, resulting in easier field training. Servicing techniques and equipment would be common between controls, thereby minimizing repair time. Moreover, every module can be thoroughly tested before being incorporated in a new control, thereby improving equipment relationship. Most significantly, by maximizing the use of software for the control functions, control features can be easily changed or added. Finally, by using common readily available circuit components, reliability is maximized while costs are minimized. Thus, a microprocessor based voltage regulating transformer using modular design components opens a new dimension in power system controls. The applications and benefits are limited only by the imagination and ingenuity of the user.

Numerous other advantages and features of the present invention will become readily apparent from the following detailed description of the invention and from the embodiments thereof, from the claims, and from the accompanying drawings.

BRIEF DESCRIPTION OF THE DRAWINGS

FIG. 1C is a partial exploded view of the main components housed within the control cabinet shown in FIG. 1B;

FIGS. 3A through 3E illustrate the functional operation of the keyboard shown in FIG. 2B;

FIGS. 5A through 5E form a schematic diagram of the hardware modules shown in FIG. 2A;

FIG. 6A is a diagram showing the relationship between the voltage regulating transformer, the load attached thereto, and the principal electrical parameters;

FIG. 6B is a graphical representation of the phase relationship between the current and the voltage at the output terminals of the voltage regulating transformer shown in FIG. 1A;

FIGS. 8A through 8E are flow charts of the MERTOS Operating System;

FIGS. 10 through 27 are flow charts illustrating the manner in which data is manipulated and processed within the microcomputer hardware components shown in FIGS. 5A through 5E.

DETAILED DESCRIPTION OF THE PREFERRED EMBODIMENT

While this invention will be described in connection with a preferred embodiment, it should be understood that it is not intended to limit the invention to that specific embodiment. On the contrary, it is intended to cover all alternatives, modifications, and equivalents and may be included within the spirit and scope of the invention as defined by the appended claims. It should be understood that the present disclosure is to be considered as an exemplification of the principles of the invention.

One of the keys to the present approach of microcomputer design is to take advantage of the similarity of various power system controls by subdividing both hardware and software design requirements into common modules applicable to all. Once these modules have been designed and developed, they form a set of reusable "building blocks" which can be combined to create a foundation for other power system controls. This design approach should be kept in mind in reading the detailed description of the invention which follows.

There are two basic design areas that make up a microprocessor-band control. The physical elements, such as integrated circuits, resistors, capacitors, displays, switches, and so forth, form a series of "hardware" modules. Once constructed, they are not readily modified.

The second basic design area in a microcomputer-based control is computer control procedures; these include algorithms, programs, and documentation. These elements are called "software" since they are readily changable relative to the hardware components.

Before describing in detail the hardware module and software modules, an overview of the present invention is in order.

Figure 1A:
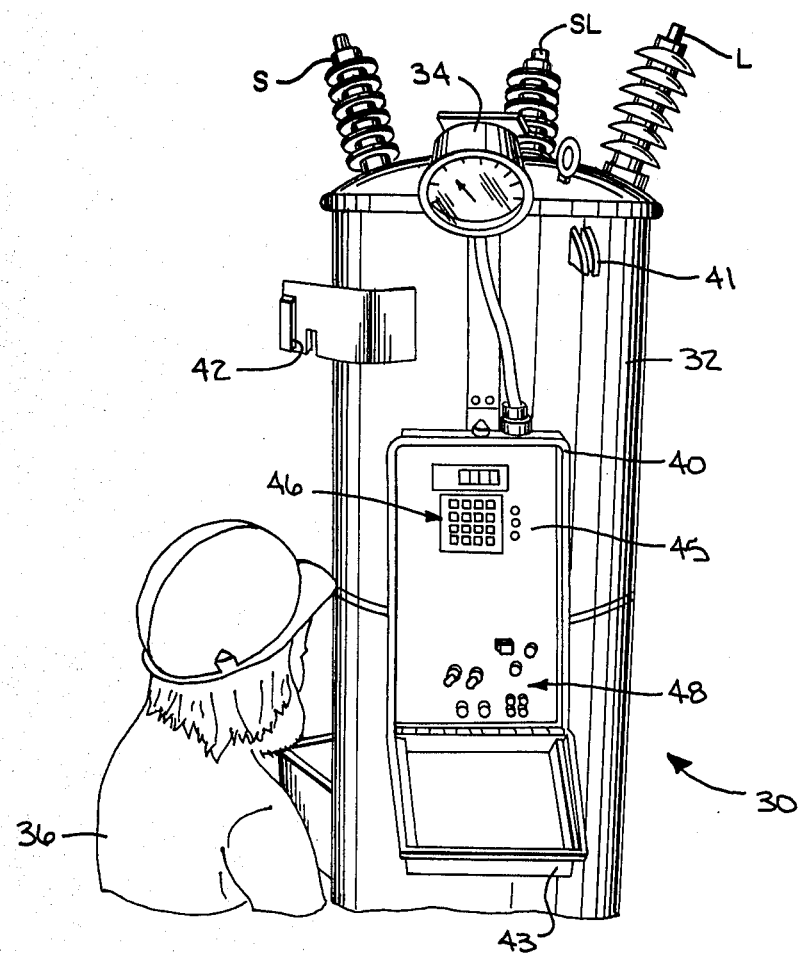
FIG. 1A is a pictorial view of a voltage regulating transformer and the associated control cabinet that form the subject of the present invention.

FIG. 1 is a pictoral view of an advanced step-type voltage regulating transformer 30. These transformers are essentially autotransformers which define a tapped series winding electromagnetically coupled to a common shunt winding. Conventionally, the transformer core and windings forming the transformer are securely mounted in an oil-filled tank 32 with the necessary input and output terminals brought out through their appropriate bushings S, SL, and L. These windings will be described in detail at a later point in this discussion. An electro-mechanical apparatus housed within the transformer tank 32 is used to change the ratio of the number of turns on the series winding to the number of turns on the shunt winding so as to control the output voltage of the transformer. Usually an indicator 34 is provided so that maintenance technicians or operating personnel 36 can readily determine the position of the tap changing mechanism. The tank 32 is used to mount a control panel or cabinet 40. This control cabinet 40 houses the electronic controls, and in this particular case, the digital computer used to trigger the tap changing mechanism into operation. The tank 32 is also provided with a set of lifting lugs 41 and 42 for ease of handling and mounting on a utility pole or similar support. The control cabinet 40 is provided with a weather-tight cover or door 43 which protects the controls from the environment. As shown in FIG. 1A, the door 43 is opened to expose the interior control panel 45. In this particular embodiment, the control panel 45 is used to mount a digital keyboard and display 46, several manually operated control switches, fuses, test points, and indicating lamps 48.

Figure 1B:
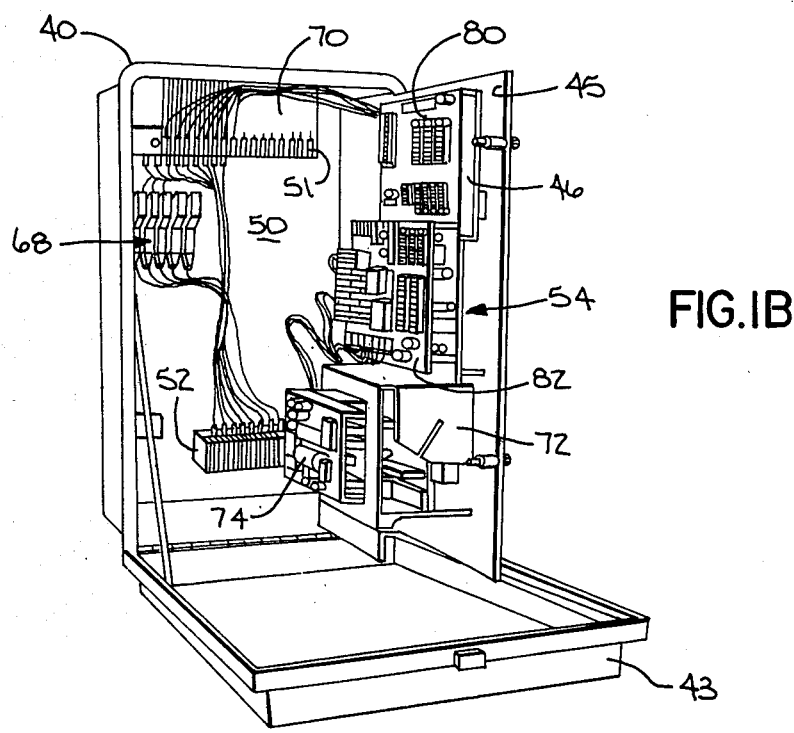
FIG. 1B is a pictorial view of the interior of the control cabinet shown in FIG. 1A.

FIG. 1B illustrates the interior of the control cabinet 40 when the control panel 45 is opened. The backside 50 of the control cabinet 40 is used to mount or support a set of terminal boards 51 and 52. In this particular embodiment, the inside of the control panel 45 is used to mount or support the hardware modules forming the present invention. These modules will be described at a later point in this discussion. FIG. 1C is an exploded view of the major hardware components and supports housed within the control cabinet 40. The general arrangement between the components housed within the transformer tank 32, the two terminal boards 51 and 52 mounted on the backside 50 of the control cabinet 40, the various operating controls 48 mounted on the lower end of the control panel, and the connections to the hardware modules 54 mounted on the backside of the control panel is shown in FIG. 1D.

Figure 1D:
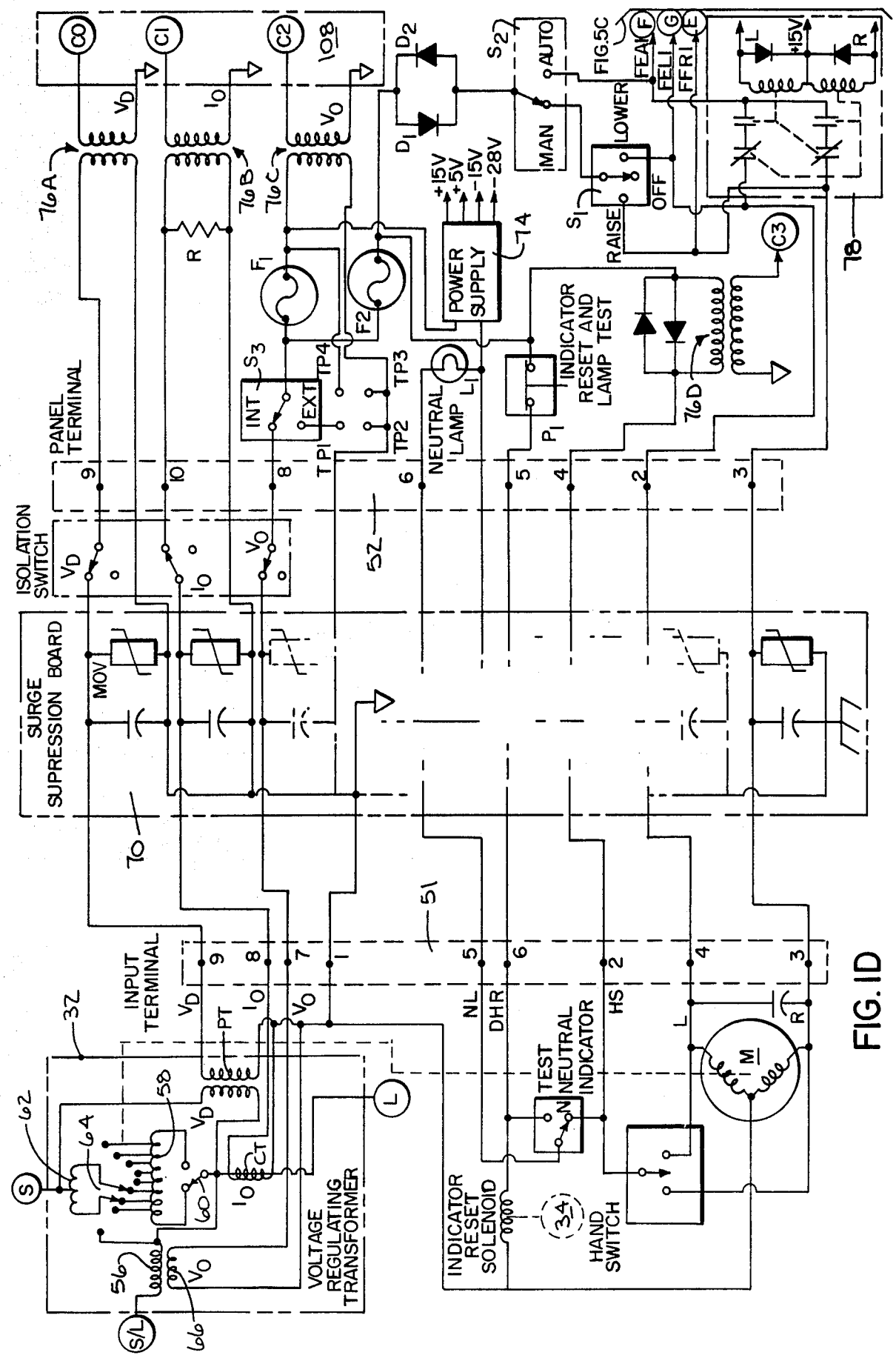
FIG. 1D is an electrical schematic diagram of the major current carrying components of the control.

Referring to FIG. 1D, the current carrying circuitry housed within the transformer tank 32 is, for the most part, conventional. Specifically, an autotransformer is formed from a shunt winding 56 and a tapped series winding 58. A current transformer primary winding CT on the load line is used to sense the current $I_o$ flowing to the load from the transformer. As illustrated in FIG. 1D, the series winding 58 is provided with eight voltage taps. A pair of neutral contacts N are directly connected to the source bushing S and the upper end of the shunt winding 56. A reversing switch 60 is provided so that all of the series windings 58 are used in both the maximum buck or the maximum boost position. An equalizer winding 62 and a set of rotating contacts or switches 64 insure that voltage is changed without current interruption. The center of the equalizer winding 62 is tapped and joined to the source bushing S. Typically, an electric motor M is used to drive the switches 64 and thereby change the voltage at the output terminal L. The motor M is also housed in the tank 32. The voltage across the shunt winding 56 is sensed by a potential winding 66. The voltage across the potential winding is proportional to the output voltage $V_o$. The voltage difference $V_D$ or the voltage across the input terminal S and the output terminal L is sensed by a potential transformer PT. Thus, instrumentation is provided to sense the current $I_o$ flowing through the output terminal L, the voltage at the output terminal $V_o$ and the voltage $V_D$ across the input terminal S and the output terminal L. The electric motor M and the switches 64 form a tap changing mechanism.

Referring to FIG. 1C, the various wires stemming from the components located within the transformer tank 32 are bundled in a cable and routed to the top of the control cabinet 40 where they mate with the upper terminal board or block 51. To facilitate maintenance on the control components, an isolation switch 68 is provided. Surge supression and electromagnetic interference reduction are provided by a surge supression board or assembly 70. This assembly is located as close to the input cable as possible and is grounded to the cabinet 40 with a very short heavy conductor. This surge supression board includes a plurality of capacitors C and metal oxide varistors MOVs joined in parallel (see FIG. 1D). The terminal board or block 52 at the lower end of the back panel 50 of the control cabinet 40 serves as a major connection point for joining the wires routed from the interior of the transformer tank 42 to the hardware modules 54 mounted on the inside of the control panel 45.

Referring to FIG. 1B and 1C, the control panel 45 carries a shelf assembly 72 which is used to mount a power supply 74 and four isolation transformers 76A, 76B, 76C, and 76D. These transformers electrically isolate the voltage signals C0, C1, C2, and C3 flowing to or processed by the hardware modules mounted on the control panel 45. The power supply 74 in this particular embodiment provides a relatively stable source of 15 volts D.C., 5 volts D.C., minus 15 volts D.C., and minus 28 volts D.C. (see FIG. 1D).

The remaining components shown in FIG. 1D are conventional and, for the most part, are found on standard voltage regulating transformers. In particular, a AUTO/MANUAL toggle switch S2 is provided for taking manual control of the tap changing motor M. This switch S2 is used in conjunction with a spring loaded switch S1 to manually control the direction of rotation of the motor M. This circuit is protected by a fuse F2. Two diodes $D_1$ and $D_2$ provide a bias current to transformer 76D to run the motor M. A pushbutton swtich P1 is used to reset the tap changing position indicator 34 (see FIG. 1A) and test the neutral indicating lamp L1. Four test points TP1, TP2, TP3, and TP4 are provided for field personnel 36 to monitor voltages and to test the operation of the transformer 30. Finally, a set of relays 78 is used to control the direction of current flow through the tap changing motor M. When the AUTO/MANUAL switch S2 is in the automatic position, the direction of current flow through the tap changing motor M is controlled by the contact path set up by the relay assembly 78.

Now that the overall arrangement of the invention, the electrical parameters or values which are sensed or monitored, and the general manner in which the output voltage can be changed has been described, the manner in which these components are operated will be described. The apparatus for performing this function is mounted on three electronic circuit boards 46, 80, and 82 which are carried at the upper end of the inside of the control panel 45. The functional relationship of these circuit boards is shown in FIG. 2A.

HARDWARE MODULES

Figure 2A:
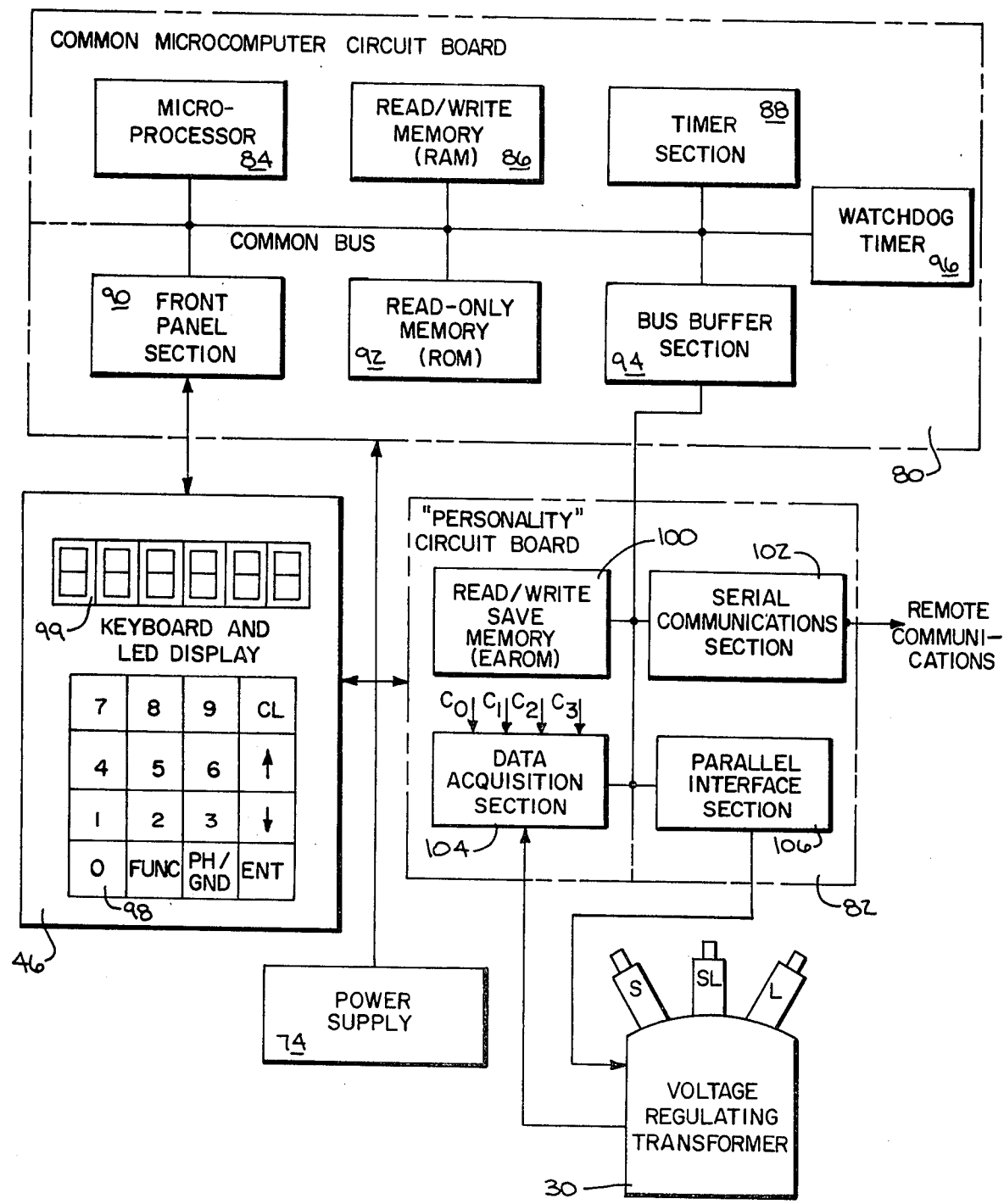
FIG. 2A is a block diagram of the various hardware modules forming the present invention.

Referring to FIG. 2A, the Microcomputer Circuit Board 80 is the principal hardware module. This board is the hardware heart of the control. It contains a microprocessor 84 and the components closely related to its operation, and the ROM's 92 that contain the computer software operating system as well as the central program. The Display Circuit Board 45 plugs into the Microcomputer Circuit Board 80 and contains the input (keyboard 98) and output (LED's 99) to permit operating personnel 36 to "talk" to the computer. It will become clear from the subsequent description that the Microcomputer Circuit Board 80 and the Display Circuit Board 46 have been designed to be readily adaptable to other microcomputer based electrical distribution system controls. The only items that change for additional applications are the ROM's 92 that carry the exact program for the required function and the Personality Circuit Board 82.

The Microcomputer Circuit Board 80 include: a Microprocessor 84, a Read/write Memory 86, a Timer Section 88, a Front Panel Section 90, a Read-only Memory 92, a Bus Buffer Section 94, and a Watch Dog Timer 96.

The Microprocessor 84 is the circuit element that performs the various arithmetic and logic functions of the control. One embodiment of the invention uses a Motorola 6802 microprocessor. It is one of the most powerful microprocessors now available and is particularly suited to a power system control application. All the required logic circuits as well as capabilities for easy servicing are included.

The Read/Write Memory 86 is primarily used for storing data. Data is stored here so long as electrical power is supplied. This memory functionally serves as a group of registers for storing digital signals representative of information processed by the microprocessor module 84.

The Timer Module 88 provides a 60 Hertz over-and-under frequency monitor, one of the essential ingredients in a co-generation protection scheme. This module can also provide time-of-day information for load flow studies and fault history data.

Figure 2B:
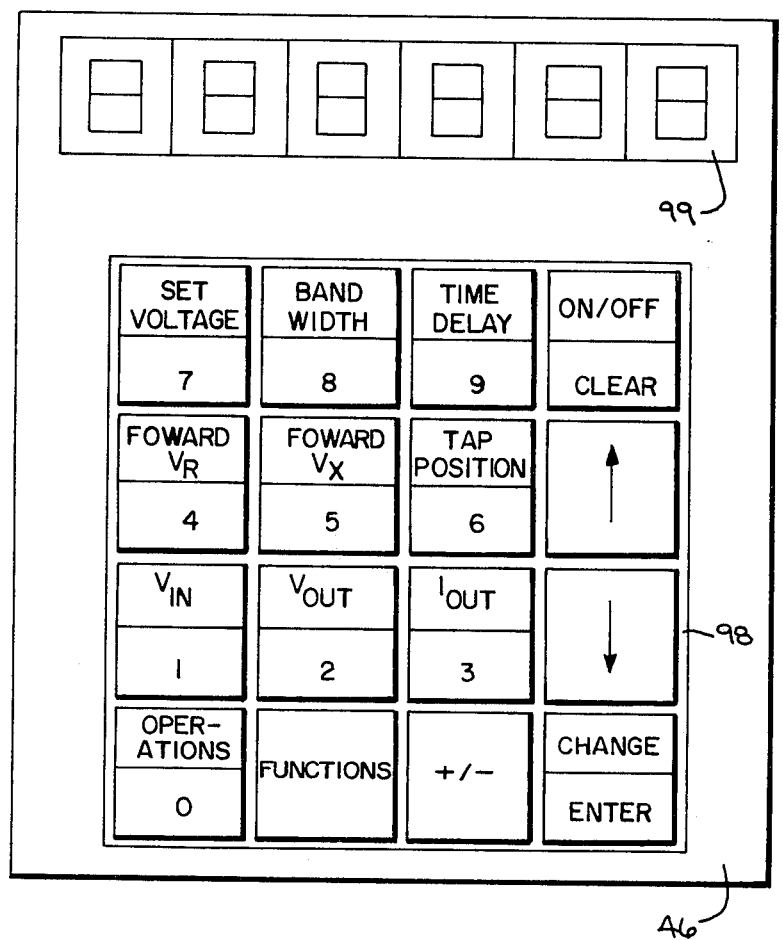
FIG. 2B is an enlarged view of the keyboard and LED display shown in FIG. 1A.

The Front Panel Section 90 is used to interface the front panel light-emitting diode (LED) display and keyboard 46 (see FIG. 1A) to the Microprocessor 84. The microprocessor control scheme eliminates the need for a large number of panel mounted control switches and an inventory of plug-in components by storing in semiconductor memory the control settings the user has selected. These selections are entered on a calculator-type keyboard 98 (see FIG. 2B). The keyboard 98 is used to: preset the device for operation; change the device settings during operation; read (see FIG. 3B) any of the power line characteristics (i.e. Line Drop Compensation; Set or Reference Voltage; Set or Reference Current; Motor Time Delay; Voltage Limiting Status; Low Settings, etc.); or check the device for correct operation. Interrogation of existing setting would be achieved by pressing a function key or entering a function code and observing the setting on a LED display 99 (see FIGS. 3A, 3B, and 3C). Entry of new settings requires the operator to first enter a security code to verify that he is qualified to make such additions or modifications (FIG. 3D). Once the security code has been cleared, the user can then enter new settings (FIG. 3E).

Operation of the Front Panel Section 90 is software controlled for maximum flexibility, particularly in the area of display characters. By using this module on other similar controls, the layout and operation of the front panel keyboard 98 and LED display 99 remains similar and easy to master.

The Read-Only Memory 92 is preferably electrically programmable for easy modification. It is used for storing programming information. It would include a detailed program describing the manner in which the digital data is processed according to the software algorithms selected to manipulate the data to produce the desired result. This will be described in detail at a later point.

One or more Bus Buffer Sections 94 are used to extend the number of Personality Modules 82 used in a particular control design. With the use of buffers, an almost unlimited number of interfacing modules could be configured to use the Microcomputer Circuit Board 80.

The "Watch Dog" Timer 96 is used to insure proper control operation even if the control were to suffer a temporary failure. The "Watch Dog" circuit would then interrupt the operation of the microcomputer to diagnose and correct the error. In one embodiment of this feature, the Watch Dog Timer 96 consists of a missing pulse detector which requires a steady stream of input pulses to prevent an output from being transmitted. In the event that the proper program flow is lost and the system is interrupted, the Watch Dog Timer 96 would "time out" forcing the computer to be reset. As shown in FIG. 5E, the Watch Dog circuit is a resetable R-C timer which can interrupt the operation of the microcomputer if it is not regularly reset by the microcomputer. In effect, it serves to diagnose and correct errors in software data transmission.

Now that the modules forming the Microcomputer Circuit Board 80 have been described, the modules included in the Personality Circuit Board 82 will be described. These modules include a read/write/save memory (EAROM) 100, a serial communications section 102, a data acquisition section 104, and a parallel interface section 106. The Personality Circuit Board 82 is dedicated to the hardware functions unique to a voltage regulating transformer control. This board has additional memory (EAROM) 100, and the ability to receive analog signals and supply the Microcomputer Circuit Board 80 with a digital signal representative of them and the position of the relay contacts. The Personality Circuit Board 82 provides the required input and output interfacing between the apparatus 30 being controlled and the microcomputer. One of the most important functions of this interfacing is the buffering of the input and output lines to prevent unwanted signals and electromagnetic interference (EMI) from affecting sensitive areas of the control causing false responses or damage to the circuit elements.

The Read/Write/Save Memory 100 stores and retains data even without power. No battery is required. This module is used for storing settings, security codes, serial numbers, historical data, etc.

The Serial Communication Section 102 enables the microcomputer to communicate with other devices, as required in an automated distribution system, allowing the microcomputer to be remotely controlled. This module can also be used to dump bulk data to a data recorder for analysis at some future time. For example, the current time characteristics of the tap changing motor M could be recorded to determine if the mechanism is in need of repair.

Figure 4A:
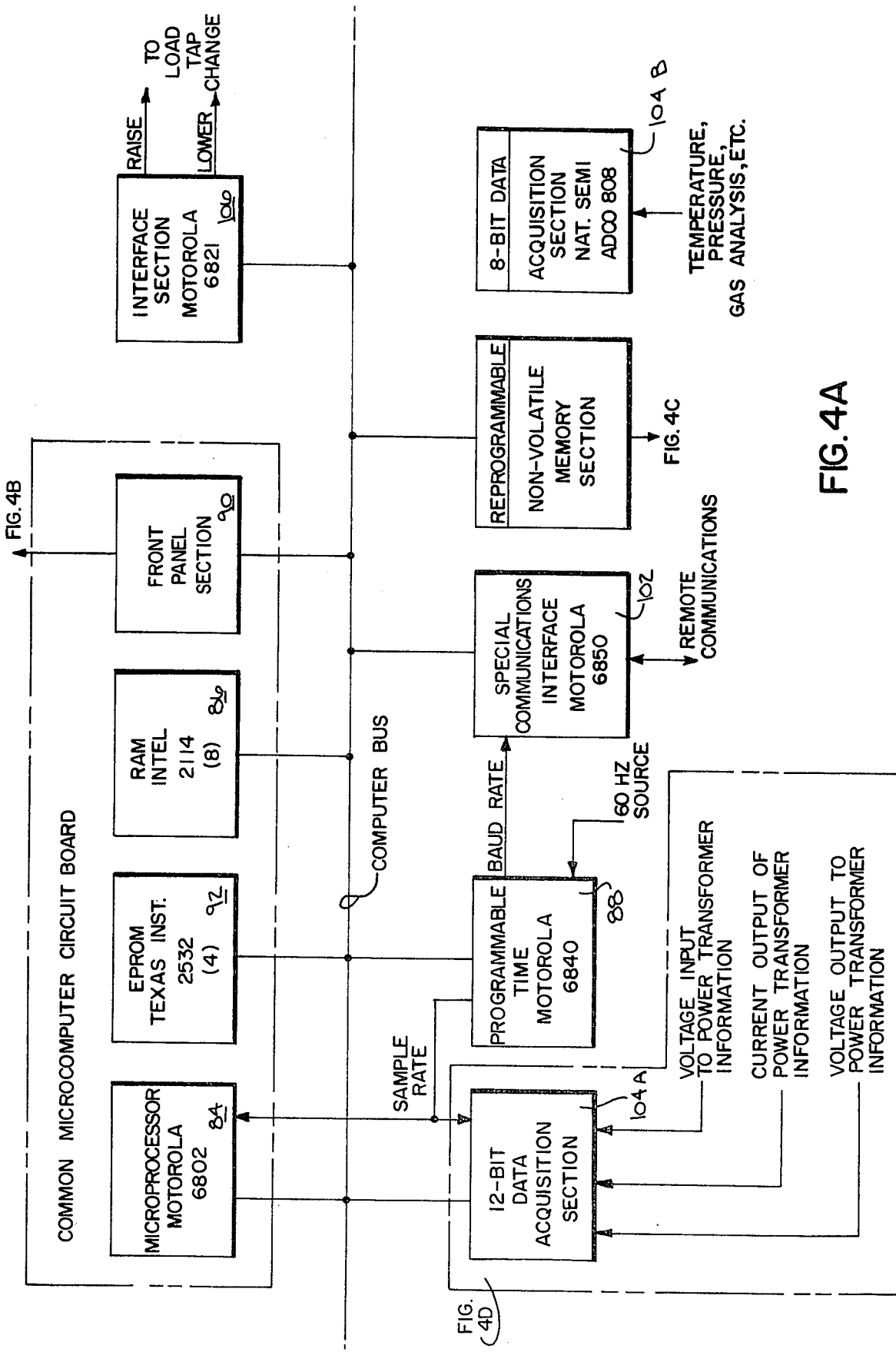
FIG. 4A is a block diagram of another embodiment of the invention.
Figure 4B:
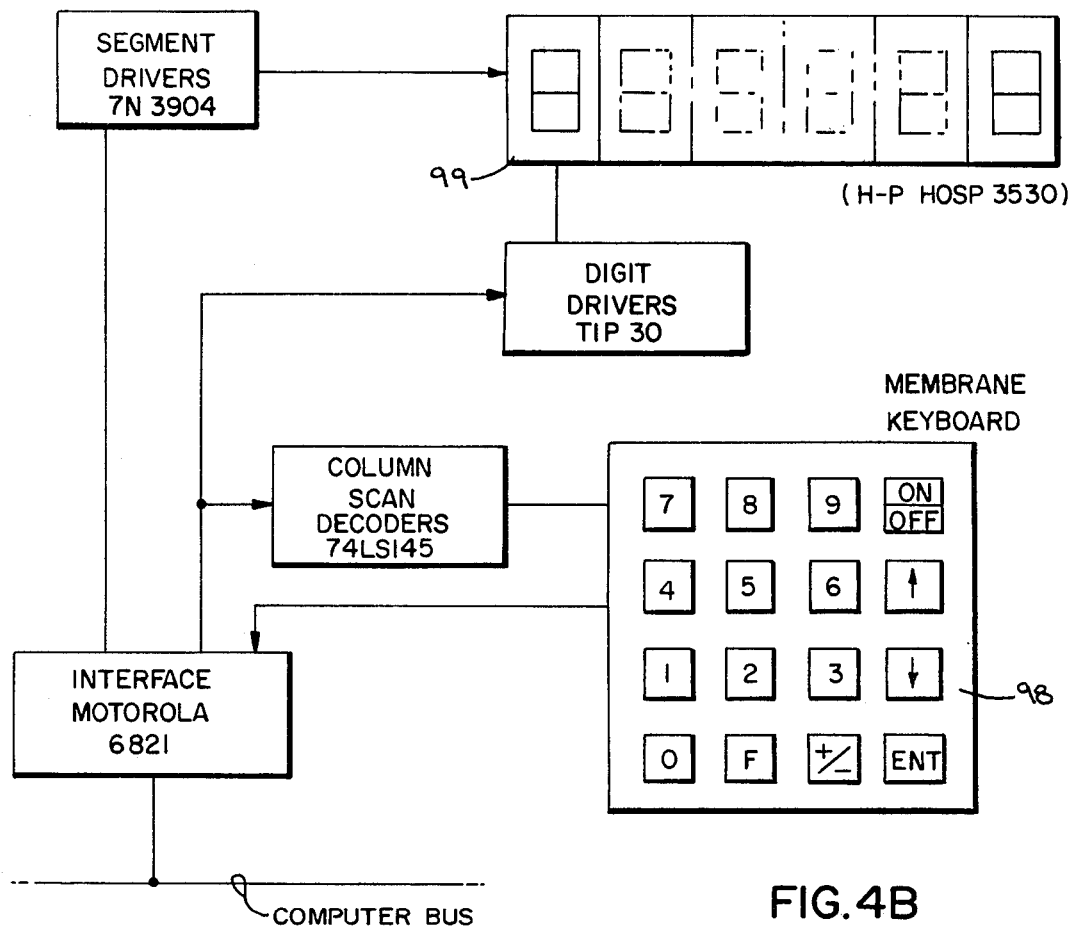
FIG. 4B is a block diagram of the Front Panel Section shown in FIG. 4A.
Figure 4C:
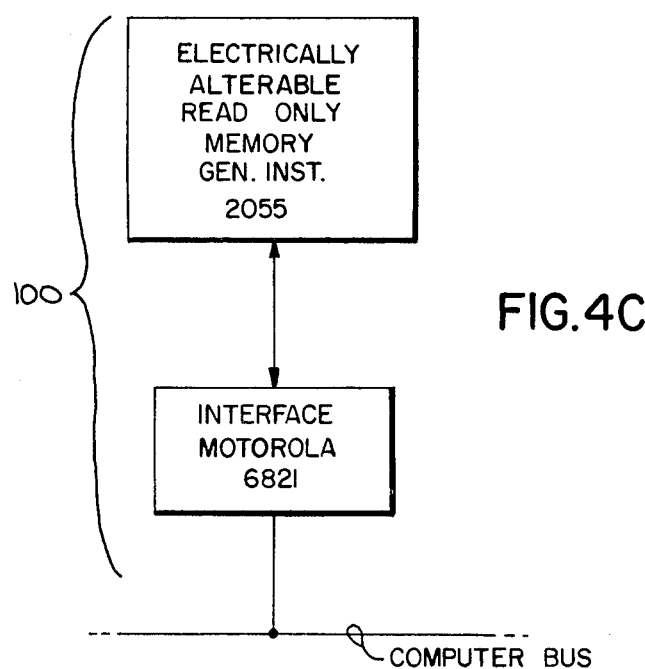
FIG. 4C is a block diagram of the Non-volatile Memory Section shown in FIG. 4A.
Figure 4D:
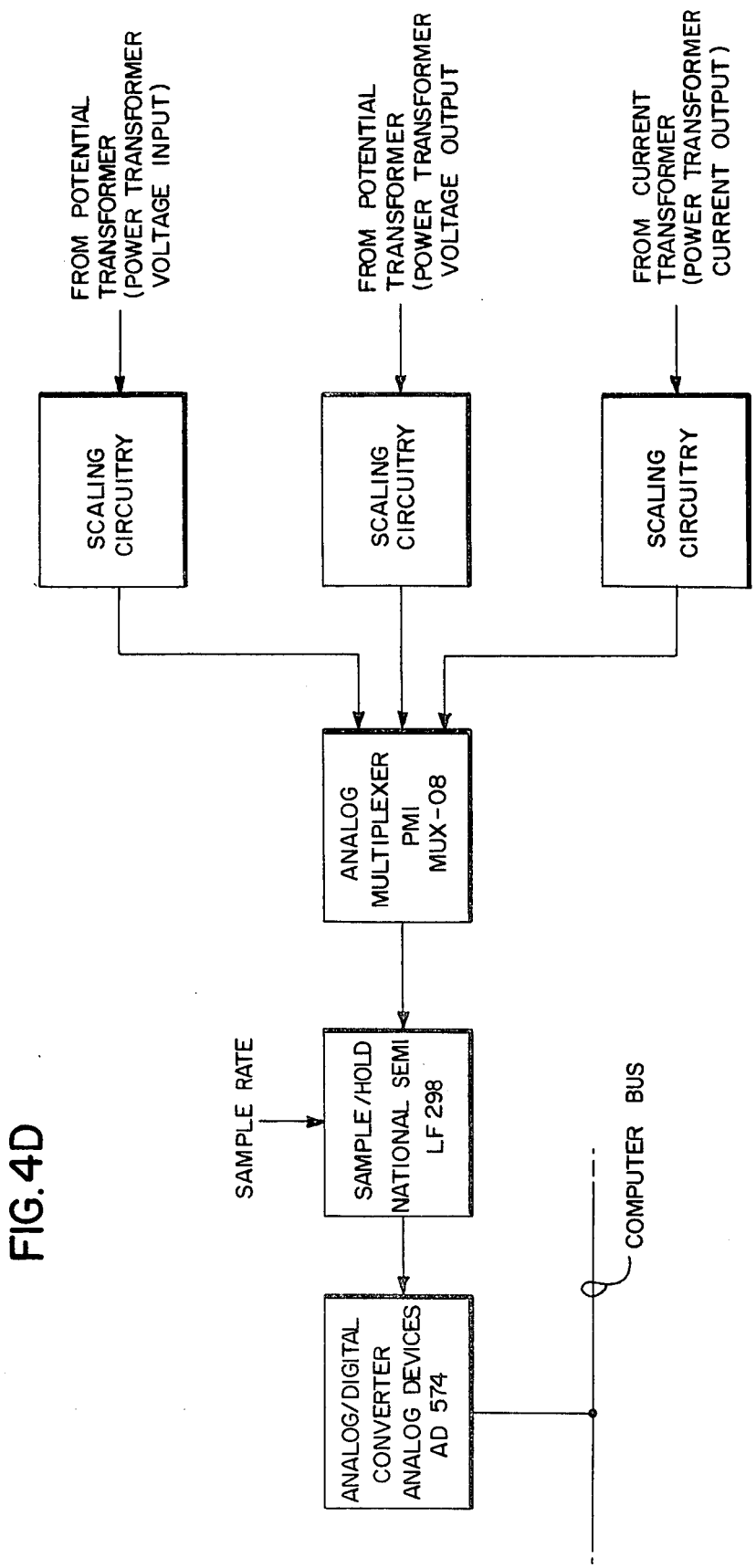
FIG. 4D is a block diagram of the 12 Bit Data Acquisition Section shown in FIG. 4A.

The Data Acquisition Section 104 provides power system status information to the microcomputer (see FIG. 4D). Specifically, this module includes an analogue-to-digial convertor (A/D) which provides the microcomputer data from the power system which it needs to perform its control function. Preferably, this would include environmental information regarding the temperature, pressure, etc., of a cooling medium surrounding the transformer (see FIG. 4A).

The Parallel Interface Section 106 is used to interface the microcomputer to other components of the control. Here status information regarding relay contacts (i.e. FEA1, FEL1, and FFR1 in FIG. 1D) is provided for internal processing. Information conveyed in this manner could include customer supplied relay contact position, signals, and two state input signals to set into operation special control modes.

From the foregoing description it should be noted that this design approach allows one to develop an "instant schematic" of a control created by literally laying module schematics side by side like a jigsaw puzzle. Thus, new modules can be added to this system as technology advances or design requirements change.

To demonstrate the manner in which the various modules and sections just described can be configured to form a new control apparatus, FIGS. 4A, 4B, 4C, and 4D are provided. This is a block diagram of a control suitable for use with a LTC transformer. These transformers are basically similar to a voltage regulating transformer with the exception that they are generally used to carry larger amounts of power. The functional blocks in FIGS. 4A through 4D generally correspond to the blocks appearing in FIG. 2A. In addition, specific digital components have been identified. Here, instead of measuring the voltage difference between the input terminal S and output terminal L, the voltage at the input terminal is directly monitored and used as an input; the voltage difference between the input and output terminals is internally computed. The front panel section is further described in FIG. 4B and the non-volatile memory section is further described in FIG. 4C. The 12-bit Data Acquisition Section is illustrated in greater detail in FIG. 4D.

It should be noted in FIG. 4A that an 8-bit Data Acquisition Section has been included. This input device would be particularly useful in monitoring temperature, pressure, gas analysis, and other environmental factors representative of the thermodynamic condition of the transformer and its surrounding dielectric fluid. Suitable information can be stored within the Read Only Memory Section 92 in the form of a "look-up table" defining digital values representative of the expected thermodynamic condition of the transformer when it is operating normally. Such a look-up table can be filled with values varing with the voltage and current passing through the transformer as well as the external temperature and humidity. Thus, it would be practicable to operate the LTC transformer on a real time basis to maximize its total operating capability. This would give electrical utilities added margin in operating their power distribution system.

SCHEMATIC DIAGRAM

Turning to FIGS. 5A through 5E, a schematic diagram is presented which shows the manner in which digital components may be joined together to form the microprocessor control otherwise functionally described shown in FIG. 2A. It will be appreciated that a drawing of the hardware must be of a fairly general system in which most of the features which are peculiar to this invention are hidden in the software within the read/only memory (ROM) 92, or the programming which carries the instructions to be followed. It is not possible to give exact details of the program or software without restricting the discussion to one particular family of microprocessor chips. It is proposed, therefore, to give a brief description of the hardware and then to describe in general terms the main programming techniques required for the pesent invention. This will then enable one "skilled in the art" to build a model patterned after this description and the usually available technical literature provided by the manufacturer of the particular microprocessor selected.

Figure 5A:
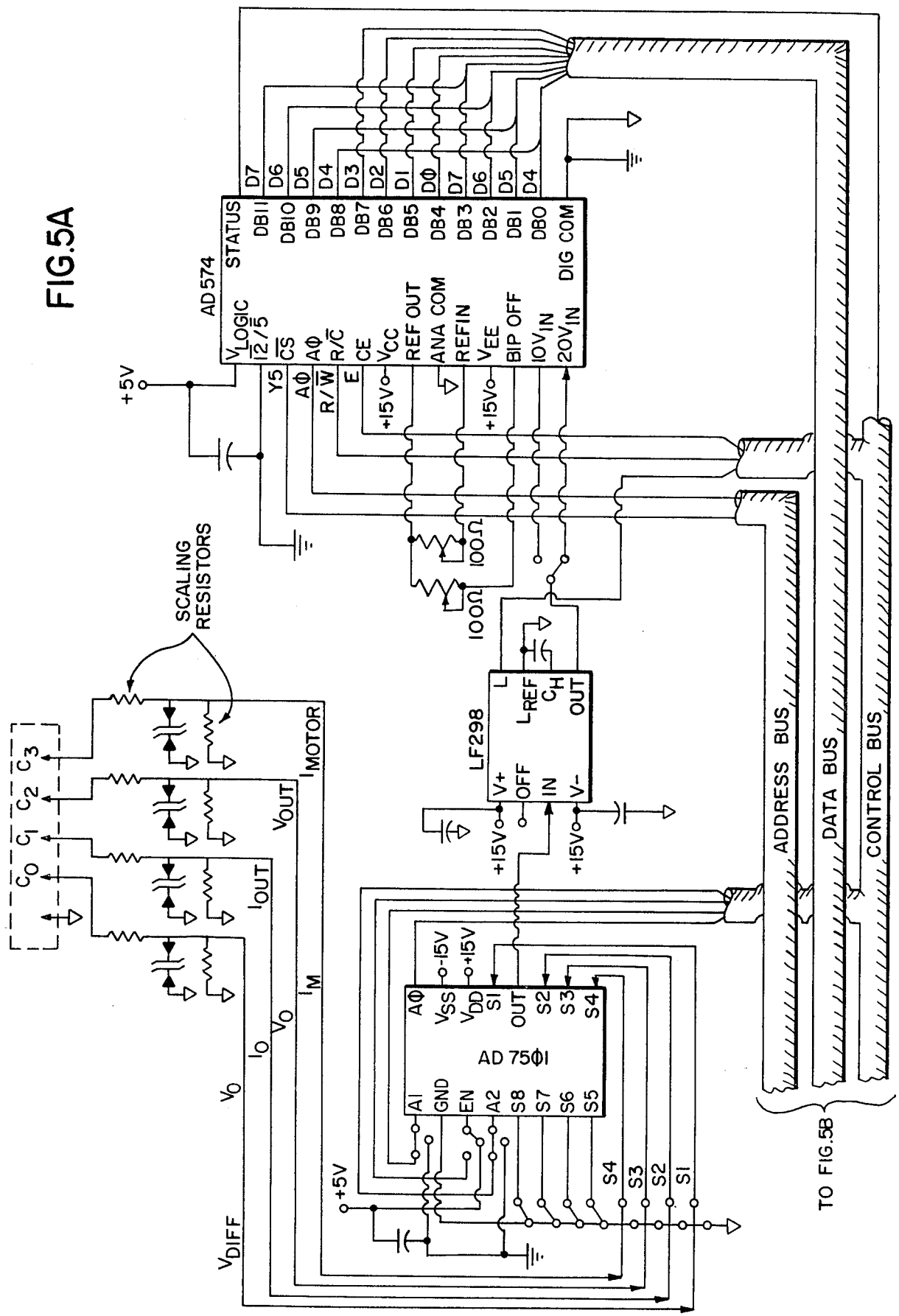

With these thoughts in mind, FIG. 5A represents the components forming the Data Acquisition Section 104 of the Personality Circuit Board 82. In particular, the circuit is arranged to multiplex the analog voltage signals $C_0$, $C_1$, $C_2$, and $C_3$ representing instantaneous values of the voltage $V_O$ at the output terminal of the transformer, the current $I_O$ flowing out of the output terminal L, the voltage difference $V_D$ across the input terminal S and output terminal L, and the current $I_M$ flowing through the motor M operating the tap changing mechanism. The particular sequence in which these analogue signals are sampled will be discussed at a later point in this discussion when the software modules are explained. Appropriate scaling is provided by the resistor divider network and the isolation transformers 76A, 76B, 76C, and 76D (see FIG. 1D) before these signals are multiplexed AD 7501. After passing through a sample and hold circuit LF298, the selected analog signals are converted to digital signals through the use of an analog digital converter AD574. The output from the analog to digital converter AD574 is a series of data bits which flow to the computer's Data Bus. This method of data acquisition is fairly standard. Certainly, there are other methods and components which can be used to digitize the incoming analog signals.

Returning to FIG. 5B, the remaining sections of the Personality Circuit Board 82 are illustrated. In particular, there is illustrated the Serial Communication Section 102, the Read/write/save Memory (EAROM) 100, and the parallel interface section 106. There are many commercially available devices which can be used to implement the functions of these sections. For example, the Read/write/save Memory 100 can be formed from two General Instrument 2055's interfaced with a Motorola 6821 PIA (peripheral interface adaptor). This provides for 128 BYTES of memory. The Motorola 6821 PIA is also useful to interface with the front panel section 90 and the relay assembly 78 shown in FIG. 5C.

Figure 5B:
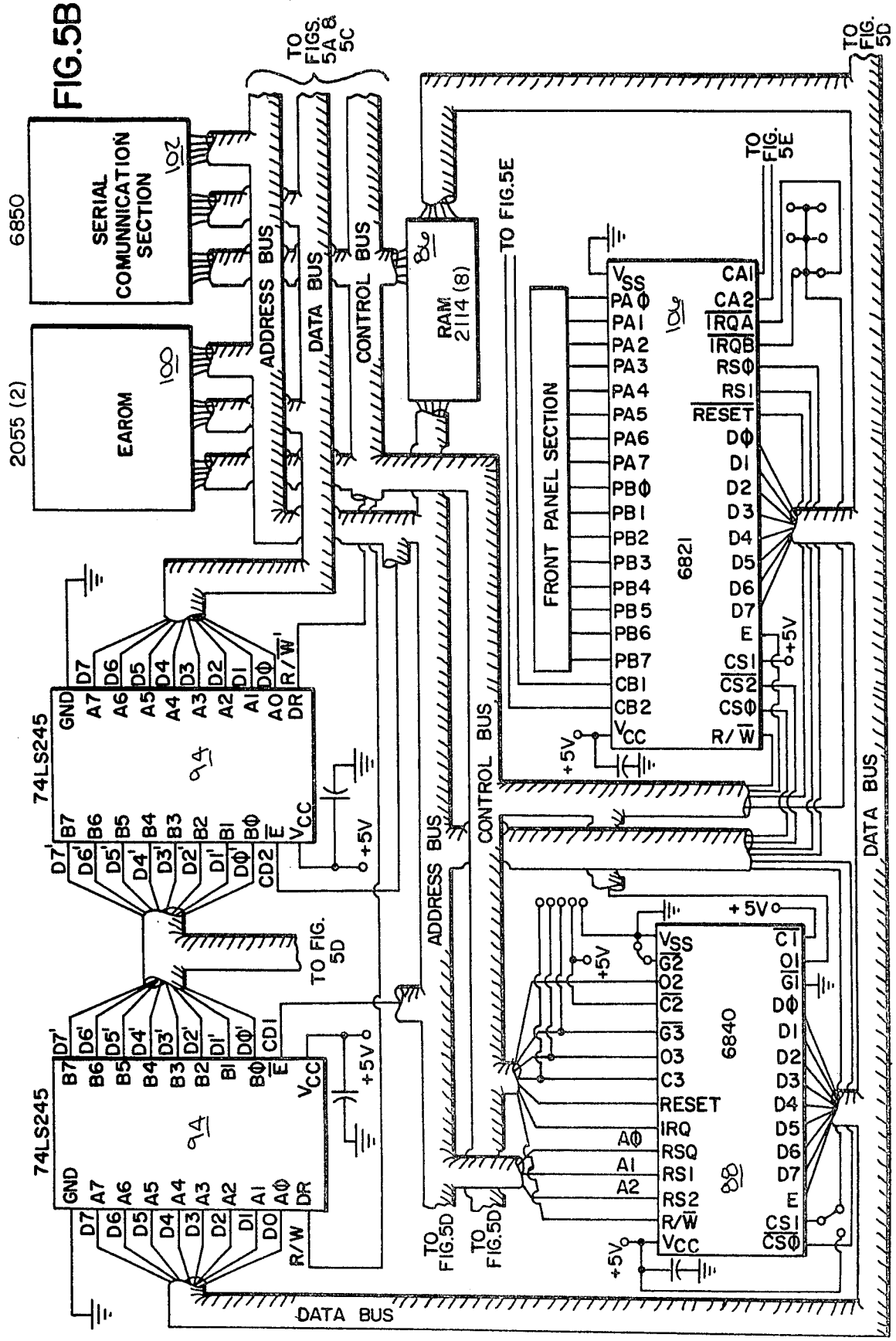

The remaining components shown in FIG. 5B are part of the Microcomputer Circuit Board 80. In particular, eight Intel 2114 chips are used to form a 4096 BYTE Read/write Memory (RAM) 86. Also shown are the two integrated circuits 74LS245 forming the Bus Buffer Section 94. The Timer Section 88 is formed from a Motorola 6840.

Figure 5D:
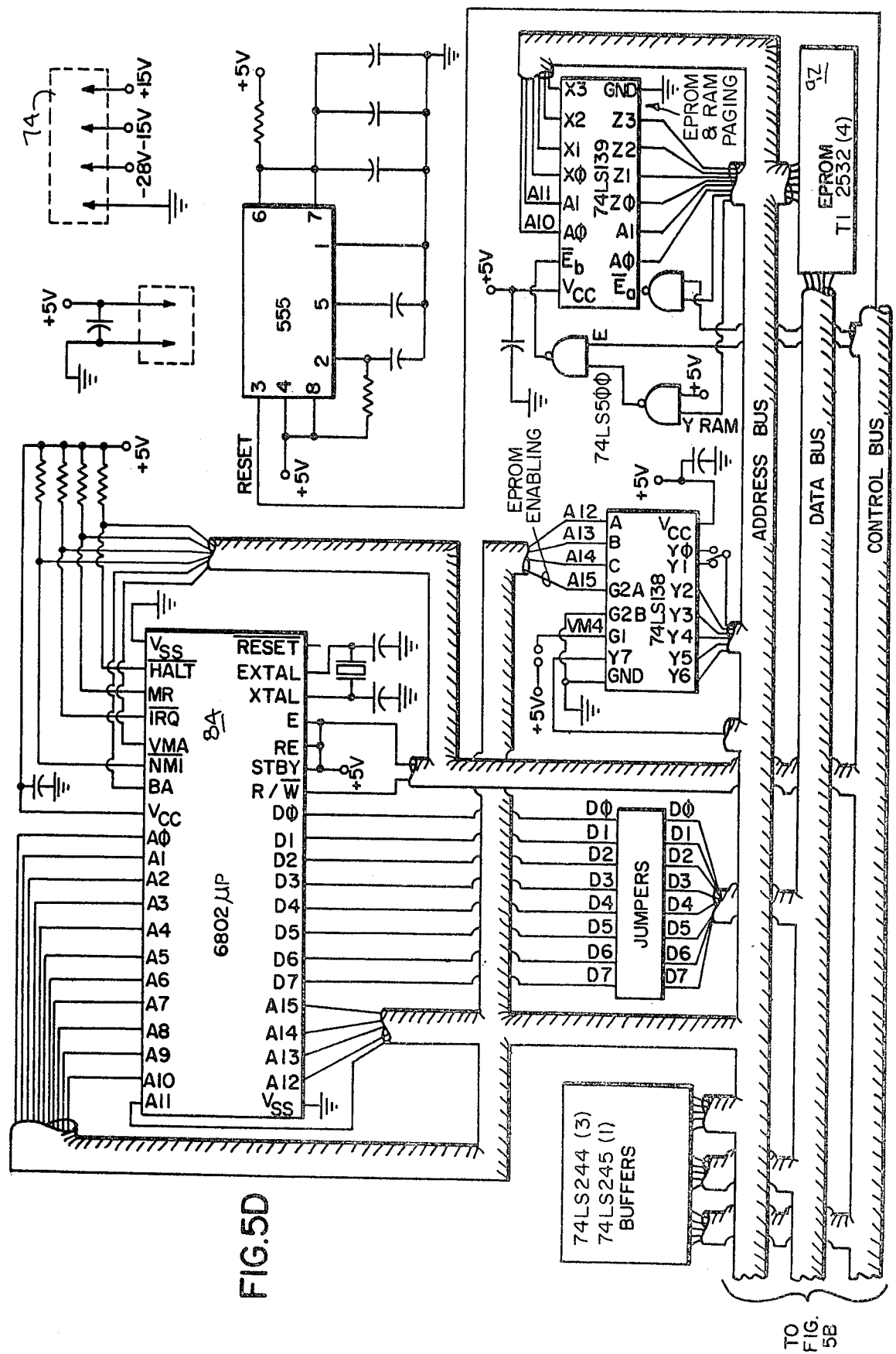

Turning to FIG. 5D, the remaining components of the Microcomputer Circuit Board 80 are shown. In particular, a Motorola 6802 microprocessor chip is used to control the flow of information through Data and Address Buses. A quartz crystal 109 provides 4 MHz timing pulses. The microprocessor 84 has eight pins through which wires are attached for the movement of data into and out of the unit and form the Data Bus (D0 through D7) and sixteen pins (A0 through A15) which carry binary numbers to the Address Bus. In contrast to the data bus in which information can flow in both directions, the address bus carries information only outward from the microprocessor 84 to the RAM memory 86 and the read/only memory (EPROM) 92, as well as to the various "chips" connected thereto. In this particular case, the read/only memory 92 is formed from four Texas Instrument 2532 chips. Finally, there is a collection of assorted signals to enter and leave the microprocessor 84. Some of these carry control signals back and forth between the microprocessor 84 and the read/only memory 92, "EPROM and RAM paging", through the 74LS 139 and 74LS138 chips) to the RAM memory 86 and the other interfacing chips; these signals form the control bus. In this particular embodiment, additional buffering is provided by three 74LS244 chips and one 74LS245 chip. Finally, circuit bank selection is provided by the 74LS138 chip which takes four address bits ($A_{12}$ through $A_{15}$) and decodes/codes them into seven bits ($Y_1$ through $Y_7$).

At this point, it should be noted that three Signetics 555 chips are used in the circuit. The 555 chip shown in FIG. 5D is used for a reset control on initial start up of the apparatus. It ensures that the power supply has stabilized before control functions are attempted. The two 555 chips shown in FIG. 5E form the Watch Dog Timer 96 of the Microcomputer Control Board 80 (see FIG. 2A). Power is provided through plug in connectors from the power supply 74 (see FIG. 1D).

Turning to FIG. 5C, the output end of the control is illustrated. The relay assembly 78 is operated when one of two common emitter transistor switches 112L and 112R are energized by digital signals flowing from the Parallel Interface Section 10g. The relay assembly sets up the four contacts to control the direction of current flow through the motor M. One optically isolated relay 114 is used to signal the microprocessor when manual control of the tap changing mechanism has been taken by using the front panel switch $S_2$ (see FIG. 1D). Two other optical isolated relays 116R and 116L tell the microprocessor when the motor M is ordered to raise or lower the tap changing switch 64. To add greater versatility to the manner in which the voltage regulating transformer 30 may be used by the particular customer or utility, a set of optically isolated relays 118A, 118B, and 118C are provided. These relays are triggered into operation by energizing appropriate terminals A, B, and C on the circuit components housed in the control cabinet 40. For example, these terminals may be provided with appropriate relay connections so that the output voltage of the transformer 30 could be reduced when a voltage reduction mode is in effect. Similarly, the normal output voltage of the transformer could be raised for a special loading condition. The energization of one or more of these optically isolated relays 118A, 118B, and 118C effectively signals the microprocessor that one of these special operating modes has been selected by the user. From the foregoing, it should be clear that the various operating modes of the microprocessor are readily adaptable to the particular needs of the customer or utility. The versatility and virtually limitless operating characteristics of the device are all the more evident when one understands that the operation of the device is largely governed by the software programming in use.

SOFTWARE MODULES

The other major microcomputer design area is, of course, "software". Two types of software are employed: an operating system, and an application program. A real-time operating system, MERTOS (see FIG. 7), was designed specifically for handling these activities in a microcomputer-based control apparatus. MERTOS, the McGraw-Edison Real-Time Operating System, is the software foundation of the modular approach to software design. MERTOS allows various independent tasks to be systematically incorporated into the control. This operating system is intended to be common to a family of microcomputer-based power system controls.

Figure 7:
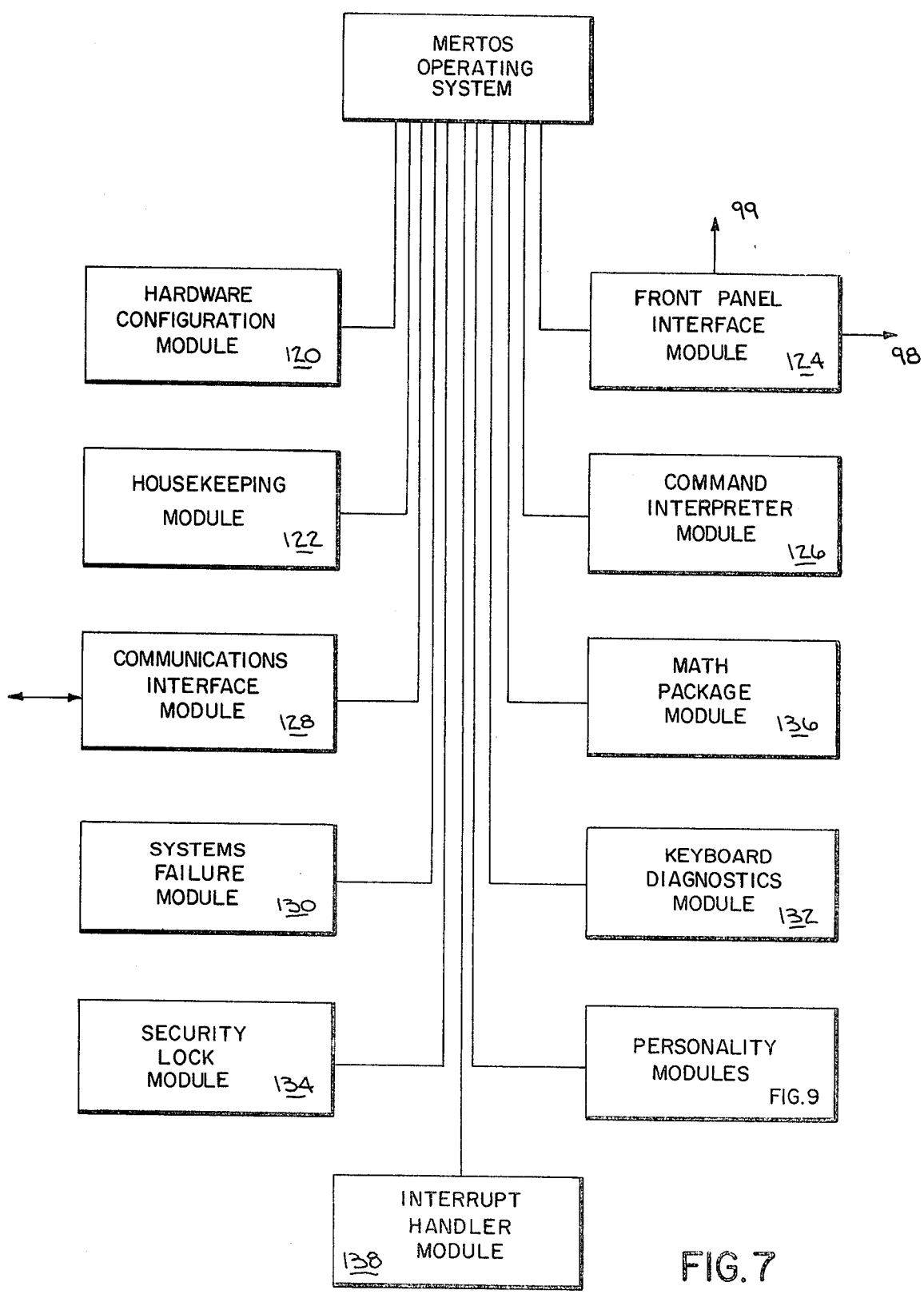
FIG. 7 is a block diagram of the MERTOS Operating System.

MERTOS itself consists of a number of modules to allow for ease of maintenance. In this case, a module refers to a program, or series of instructions, which causes the microcomputer to perform a particular task. Software modules forming MERTOS are shown in FIG. 7.

The Hardware Configuration Module 120 is used to bridge the gap between the software and hardware in the microcomputer system.

The Housekeeping Module 122 provides an orderly startup of the microcomputer system after power is first applied.

The Front Panel Interface Module 124 is used to scan the front panel keyboard 98 and to drive the LED display 99. After a key is pressed (see FIGS. 3A through 3E) by the operator 36, the raw key information is decoded and passed to the Command Interpreter Module 126.

The Command Interpreter Module 126 determines how the control responds to the various commands of an operator 36 including examining the changing control settings, as well as displaying acquired data. Since this module is intended to be common to seven microprocessor based electrical distribution controls, once an operator 36 has learned how to use one control, he would be familiar with all others. This module also processes remote-control commands, necessary for the incorporation of the control in an automated distribution system.

The Communications Interface Module 128 provides the various communications protocols necessary to interface with other equipment, particularly in future automated distribution systems. Remote operation commands received by the control through the Serial Communications Section 102 are translated and passed to the Command Interpreter Module 126.

Various faults that could occur in the microcomputer system under adverse conditions are detected and corrected by the System Failure Module 130. Included are various software "traps" preventing execution of erroneous operations. This is the software equivalent to the "Watch Dog" Timer 96 (see FIG. 2A).

The Keyboard Diagnostics Module 132 provides front panel access of individual microcomputer components, allowing a service technician to examine various portions of hardware or software. Such programs can test the keyboard 98, the L.E.D. displays 99, the various I/O ports, the memory sections, the power supply 74 and more. These types of tests would normally be used "on site" to test suspect components or as part of a maintenance program to routinely check all hardware components.

Various functions of the controls can be classified according to security levels. This serves to block their use by unauthorized operators 36. The Security Lock Module 134 provides for this function. In particular, this module allows the operator to enter a pre-determined number of digits as a security code (see Fig. 3D). Each valid security code allows a set of functions to be performed. Each invalid security code produces an error message. Many security codes can be provided, each corresponding to a different level of security. Providing for several levels of security allows functions to be inserted or performed by various levels of supervisory control.

Various mathematical functions required in the operation of the control are performed by the Math Package Module 136.

The final component of the MERTOS operating system is the Interrupt Handler Module 138. Interrupts are serial inputs that the Central Processing Unit (CPU) examines as part of each instruction cycle. These interrupts allow the CPU to react to events at the hardware level rather than at the software level through the checking of various status bits. In the MERTOS operating system, the Interrupt Handler Module 138 differentiates between important and unimportant interrupts according to a priority interrupt system. According to this system, the CPU is not interrupted unless the priority of the interrupt is higher than the operation currently in effect.

FIGS. 8A through 8E are a flow diagram of the MERTOS operating system. After the control is powered up or restarted, the stack pointer is initialized 140. Those skilled in the art know that stack addressing is a variation of implied memory addressing which is used in many microcomputers and is implemented in one form or another in almost every microcomputer. The more common stack architecture sets aside some area of the data memory for transient storage of data and addresses. The stack is addressed by a data counter type of register commonly referred to as the "stack pointer." Only two operations are usually allowed: writing to the top of the stack (i.e. often referred to as a "push") and reading from the top of the stack (i.e. referred to as a "pop" or a "pull"). The stack gets its name from the fact that it may be visualized as a stack of data words where only the last data word entered into the stack or the first empty data words at the top of the stack may be addressed. In either case, the stack is accessed via an address stored in the stack pointer.

Other initializing tasks 142 are also performed after power up or restart. The computer is directed through a bootstrapping operation to initialize read/write memories, define parameters unique to the electrical apparatus or control, wait for the power supply to stabilize, initialize the various PIA, synchronize the software clock, and initialize the various data counters and registers. Once the computer is in an operating condition, interrupts 144 are allowed to occur as directed by Interrupt Handler Software Module 138. Until then, the computer effectively is idling in a BACKGROUND subprogram 146. As previously mentioned, interupts are serial inputs that the central processing unit examines as part of each instruction cycle. These interrupts allow the CPU to react to events at the hardware level by checking status bits (i.e. polling). Interrupts, although requiring more hardware than an ordinary programmed input/output, provide a faster and more direct response.

After an interrupt has been cleared, the operating system supervises execution of subprograms according to a system of priorities 147. Each subprogram has associated with it a priority that indicates its importance relative to other subprograms and relative to interrupts from peripherial devices such as the keyboard 98.

The first subprogram to be performed is the FOREGROUND subprogram 148. It represents the highest priority time-related tasks to be performed which are not otherwise executed by an interrupt signal. MIDDLEGROUND subprograms (see FIG. 8B) are lower in priority than the FOREGROUND subprogram 148. The lowest priority subprogram, of course, is the BACKGROUND subprogram. MIDDLEGROUND includes the performance of such routines as manipulating data, updating the digital display, and accepting keyboard operations.

The operating system in directing the operation of the CPU test each of these subprogram's status and, if the subprogram has been interrupted, the CPU is restored to its condition at the moment the interrupt occurred. If the subprogram has not been interrupted, but instead has been completed, the CPU proceeds the next lowest level subprogram. Thus, each subprogram is completed, according to its priority structure, before the next subprogram is begun.

The TASK QUEUE subprogram is illustrated in FIG. 8C. It includes the operations of updating the real time clock, performance of short time queues (see FIG. 8D) such as updating the task timer flags, and long time queues such as time of day operation.

Figure 8E:
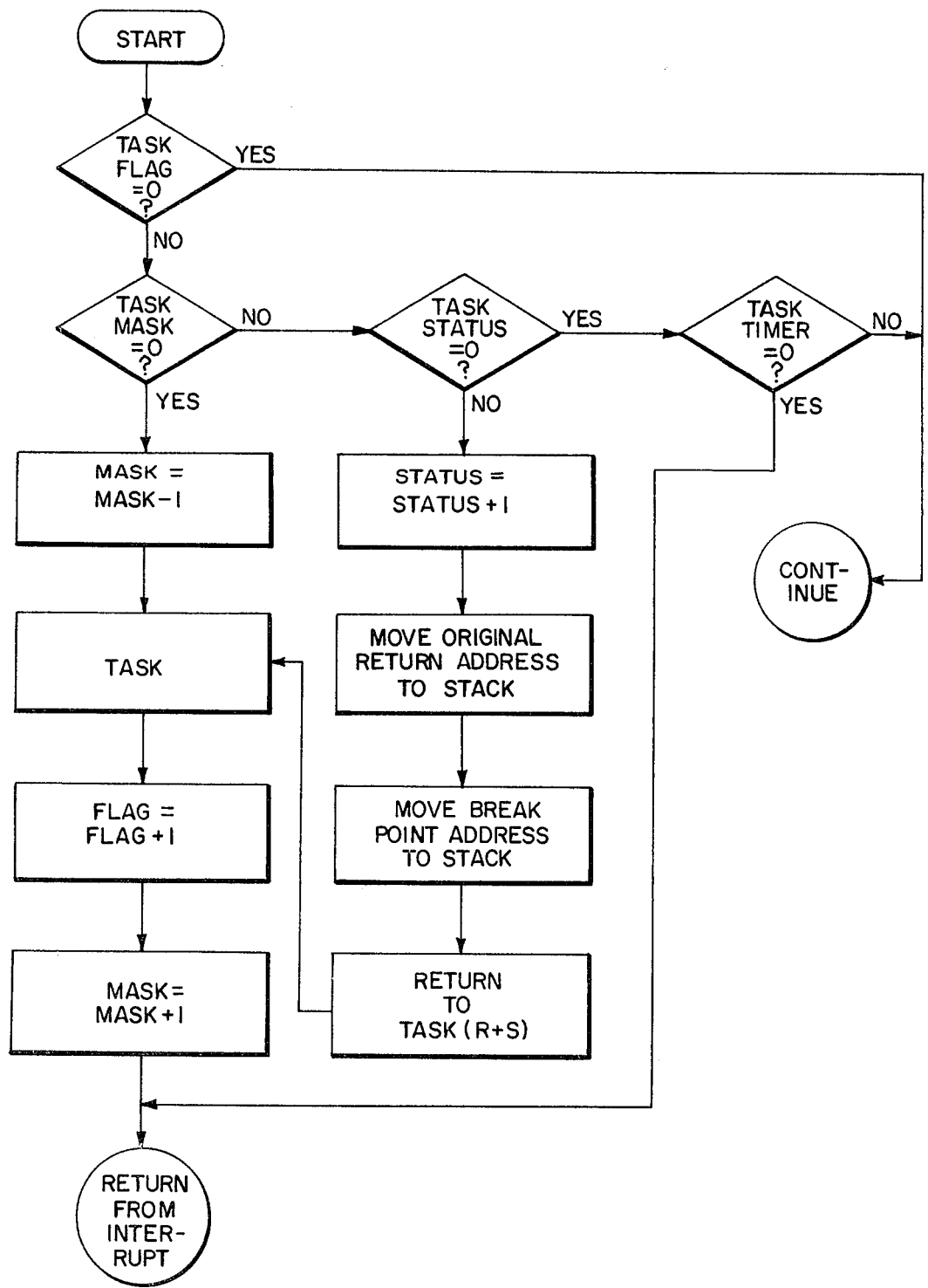

After the TASK QUEUE subprograms are completed, FLAGGED TASKS are performed (see FIG. 8E). The task status BYTE insures that flagged tasks are performed unless they are masked. A task timer serves to control the time priority assignment of the tasks.

Figure 9:
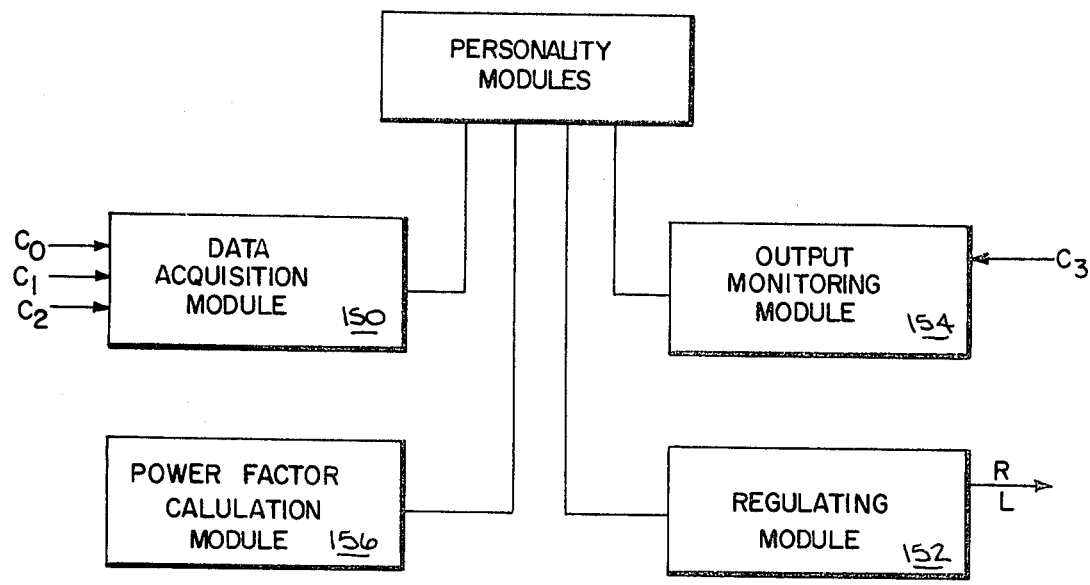
FIG. 9 is a block diagram of the Personality Software Modules.

Combined with MERTOS would be the particular software modules (algorithms and programs) that give the microcomputer the "personality" of a voltage regulator (see FIG. 9). Many accessories, not available on existing controls only through additional hardware, will be possible on a microcomputer-based control through additional software. Few, if any, additional components would be required. The individual software application modules can be readily modified or additional modules added at any time, even after the control is installed.

The Data Acquisition Module 150 samples four scaled analog input signals (output voltage $C_2$, output current $C_1$, motor current $C_3$, and differential voltage $C_o$. An A/D converter (see FIG. 5A) converts the analog signals into digital binary-offset numbers. Sampling starts after a reference of the voltage channel is established by detecting a zero crossing. This operation will be discussed at length after the other personality software modules are explained.

The regulating module 152 is the software heart of the regulator control. This module takes all input informaton from every source, combines the information as programmed, and determines the proper output. Either no output (no tap change) or a raise or a lower operation of a specific number of tap changes is calculated. The input to this module includes the output terminal voltage, the output current, the differential voltage, the set or reference voltage to be maintained, the band width (i.e. how much variation is to be allowed before the tap changer is ordered to move), line drop compensation values, and time delays (i.e. how long a particular variation in output voltage must exist before the tap changer is triggered into operation—i.e. prevents short term switch movements which are not needed). Through the output monitoring module 154, the microprocessor through the analog to digital converter, multiplexer, and tap changing motor M current sensing transformer reads the motor current that drives the tap changing switch 64. Motor current is not sensed until the current is transferred from the raise/lower relay assembly 78 to the holding switch on the tap changer motor drive shaft. Thus, when the control starts a tap switch operation via the raise/lower relay assembly, no motor current is sensed. When the holding switch picks up, the control will terminate relay operation and continue to monitor the motor current until the tap change is completed. A properly operating tap changer switch will complete these operations in a known time interval. Any variation from known time intervals could indicate equipment problems, failures, or potential trouble. The Output Monitoring Module 154 thus provides information to the microprocessor and provides for proper corrective or follow-up action based on the information provided. For example, it could try to perform the operation again, shut down the entire system, provide an alarm, or set appropriate flags for historical monitoring or transmission to a remote source for corrective action.

The Output Monitoring Module 154 and the Regulating Module 152 work in conjunction with each other to insure that a tap change has been made and that it has been made in the proper direction.

The final personality software module to be explained is the Power Factor Calculation Module 156. Those skilled in the art know that the power factor is the cosine of the phase angle or the angle between instantaneous current vector and instantaneous voltage vector of an A.C. source of electrical power (see FIG. 6A). The significance of the power vector is that it enables one to calculate the "real power" which is flowing in contrast to "reactive power". More importantly, the examination of the sign of the product of the voltage, current and power factor determines whether or not a power reversal has taken place and power is in fact flowing to the voltage regulating transformer output terminal L and not from it. Since instantaneous values of the voltage and current are measured and are measured at different points in time, the digital signals representative of the voltage and the current, as sampled, cannot be directly used to determine the phase angle or the power factor. In addition, since RMS voltage and current values are used to specify the operating characteristics of the voltage regulator, it is necessary to calculate the RMS values of the voltage and current in addition to computing their phase angle relationship. One particularly elegant and efficient technique to perform all of these data transformations is a Fast Fourier Transform.

The Fast Fourier Transform (FFT) is used to calculate the frequency spectrum and magnitude and angle of the input signals. In particular, over 1500 data samples in half a second are processed by a Fast Fourier Transform (FFT) algorithm to calculate the vector values (array of values) of the input signals. The FFT calculations result in the vector repesentation of a function. This method replicates existing hardward methods. Hardware schemes tend to be costly and are not very flexible or versatile.

FAST FOURIER TRANSFORM (FFT)

To understand the FFT algorithm, start by considering the Fourier integral:

$$H(w) = \int_{-\infty}^{+\infty} h(t) \exp[-jwt]dt \text{ where } j = \sqrt{-1}$$

It can be adapted to digital signal processing if we:
(a) Make the time variable (t) a discrete one (nT);
(b) Compute transform points for discrete values of frequency (w); and
(c) Place finite limits on the summed time limits.

This transformation is simplified when T is normalized and the number of time samples (N) equals the number of frequency samples (k). These assumptions lead to the Discrete Fourier Transform (DFT).

$$H(k) = \sum_{n=0}^{N-1} h_n \exp\left[\frac{-j2\pi n}{N}k\right], k = 0, 1, 2, \ldots N-1$$

A DFT is generally an approximation of an Integral Fourier Transform because it contains only a finite number of time samples; the integral Fourier transform requires an infinite time record of the signal.

Under certain conditions, a DFT is perfectly reversible; that is, we can recover time samples from the frequency sample H(k):

$$H(n) = \frac{1}{N}\sum_{k=0}^{N-1} H(k) \exp\left[\frac{j2\pi n}{N}k\right]$$

The DFT computes the frequency spectrum of a set of time domain samples.

The large number of computations necessary to perform a DFT usually limits the transform's use to non real time applications. To overcome this drawback, the FFT has evolved. It's an algorithm that permits computations of a DFT more rapidly than do other available algorithms.

ALGORITHM

Consider the discrete Fourier transform.

$$X(n) = \frac{1}{N}\sum_{k=0}^{N-1} X_0(k) \exp\left[\frac{j2\pi nk}{N}\right] \quad n = 0, 1, \ldots, N-1$$

Let $w = \exp\left(\frac{j2\pi}{N}\right)$ where $\pi = 3.4159\ldots$ then $X(n) = \frac{1}{N}\sum_{k=0}^{N-1} X_0(k) w^{nk}$ If N=16 (ie. no. of samples/cycle) then the fundamental component (ie. n=1) is given by:

$$X(1) = \frac{1}{N}\sum_{k=0}^{N-1} X_0(k) w^k$$

Expansion leads to:

$16X(1) = X_0(0)w^0 + X_0(1)w^1 + X_0(2)w^2 + X_0(3)w^3 + X_0(4)w^4 + X_0(5)w^5 + X_0(6)w^6 + X_0(7)w^7 + X_0(8)w^8 + X_0(9)w^9 + X_0(10)w^{10} + X_0(11)w^{11} + X_0(12)w^{12} + X_0(13)w^{13} + X_0(14)w^{14} + X_0(15)w^{15}$

From Euler's identity:

$e^{\pm j\theta} = \cos\theta \pm j\sin\theta$ it follows that:

| | |
|---|---|
| $w^8 = -1$ | since $w^8 = e^{\pi j} = -1 + j0 = -1$ |
| $w^4 = j$ | $w^4 = e^{\pi j/2} = j$ |
| $w^2 = (K_1 + jK_1)$ | $w^2 = e^{\pi j/4} = \cos 45° + j\sin 45°$ |
| $w^1 = (K_2 + jK_3)$ | $w^1 = e^{\pi j/8} = \cos\frac{\pi}{8} + j\sin\frac{\pi}{8}$ | where $K_1 = \cos\pi/4 = \sin\pi/4 = \sin 45° = \cos 45°$ $K_2 = \cos\pi/8 = \cos 22\frac{1}{2}°$ $K_3 = \sin\pi/8 = \sin 22\frac{1}{2}°$ Using:

$B_8 = X_0(0) - X_0(8)$ $B_9 = X_0(1) - X_0(9)$ $B_{10} = X_0(2) - X_0(10)$ $B_{11} = X_0(3) - X_0(11)$ $B_{12} = X_0(4) - X_0(12)$ $B_{13} = X_0(5) - X_0(13)$ $B_{14} = X_0(6) - X_0(14)$ $B_{15} = X_0(7) - X_0(15)$ and simplifying, it follows that:

$16X(1) = B_8 + B_9(K_2 + jK_3) + B_{10}(K_1 + jK_1) + B_{11}(K_2 + jK_3)(K_1 + jK_1) + B_{12}(j) + B_{13}(j)(K_1 + jK_1) + B_{14}(j)(K_1 + jK_1) + B_{15}(j)(K_1 + jK_1)(K_2 + jK_3)$

Separating the real and imaginary parts:

$X_{Re} = [B_8 + K_1K_2(B_{11} - B_{15}) - K_1K_3(B_{11} + B_{15}) + K_1(B_{10} - B_{14}) + K_2B_9 - K_3B_{13}]/16$ and $X_{Im} = j[B_{12} + K_1(B_{10} + B_{14}) + K_1K_3(B_{11} - B_{15}) + K_1K_2(B_{11} + B_{15}) + K_3B_9 + K_2B_{13}]/16$ Thus, this algorithm enables one to transform variables from the time domain to the frequency domain by measuring or obtaining sixteen samples of the instantaneous value of the variable. Moreover, since this transformation provides both a real and an imaginary component, the root means square (RMS) value of the variable can readily be determined.

Referring to FIG. 6B, at one point in time the instantaneous time independent value of volatge is given by $a_v$ and $b_v$. The corresponding current ($a_I$, $b_I$) is not available for input to the computer at the time ($a_v$, $b_v$) are sampled. Instead the current is not measured until $\theta$ sec later giving $a_m$ and $b_m$. Thus, the problem is obtaining ($a_I$, $b_I$) and $\phi$ the current phase lag.

The magnitude of the voltage at any time is V where:

$V^2 = a_v^2 + b_v^2$ $$a_v = V \cos wt$$

$$b_v = V \sin wt$$

Now, $a_v$ and $b_v$ are given directly from the DFT ALGORITHM. Once it is recognized that $a_v$ and $b_v$ are the real and imaginary components of a rotating vector in phasor notation. The DFT also provides $a_m$ and $b_m$. I is simply:

$$I^2 = a_m^2 + b_m^2$$

The problem of interest is getting $\cos \phi$, the power factor. Most importantly, when $\cos \phi$ is negative, real power (i.e. VI $\cos \phi$) is flowing in the reverse direction.

From FIG. 6B it follows that:

$$a_m = I \cos (wt + \theta - \phi)$$

$$b_m = I \sin (wt + \theta - \phi)$$

or $$a_m = I[\cos wt \cos (\theta - \phi) - \sin wt \sin (\theta - \phi)]$$

$$b_m = I[\sin wt \cos (\theta - \phi) + \cos wt \sin (\theta - \phi)]$$

Cos wt and sin wt can be eliminated using:

$$\cos wt = a_v / V$$

$$\sin wt = b_v / V$$

Therefore, $$a_m = I/V[a_v \cos (\theta - \phi) - b_v \sin (\theta - \phi)]$$

$$b_m = I/V[b_v \cos (\theta - \phi) + a_v \sin (\theta - \phi)]$$

These two equations can be readily solved for $\sin (\theta - \phi)$ and $\cos (\theta - \phi)$. It can be easily shown that:

$$\cos (\theta - \phi) = (a_v a_m + b_v b_m)/IV$$

and $$\sin (\theta - \phi) = (a_v b_m - a_m b_v)/IV$$

Using:

$$\sin (\theta - \phi) = \sin \theta \cos \phi - \cos \theta \sin \phi$$

$$\cos (\theta - \phi) = \cos \theta \cos \phi + \sin \theta \sin \phi$$

it follows that:

$$\cos \phi = \sin \theta \sin (\theta - \phi) + \cos \theta \cos (\theta - \phi)$$

or $$\cos \phi = k_1 \sin (\theta - \phi) + k_2 \cos (\theta - \phi)$$

where $k_1$ and $k_2$ are the sine and cosine of the sample delay, $\theta$.

Substituting for $\sin (\theta - \phi)$ and $\cos (\theta - \phi)$:

$$\cos \phi = [k_1(a_v b_m - a_m b_v) + k_2(a_v a_m + b_v b_m)]/IV$$

The direction of power flow is determined by the sign of (IV $\cos \phi$):

$$\text{DIRECTION} = \text{SGN} [k_1(a_v b_m - a_m b_v) + k_2(a_v a_m + b_v b_m)]$$

Now, referring to FIG. 6A: $Z = R + jX$ and $VREG = -Vout - (R+jX) * Iout$

In terms of real and imaginary parts:

$$Vout = a_V + jb_V$$

$$Iout = a_I + jb_I$$

$$Z = a_R + jb_X$$

and $$VREG = a_{Vreg} + jb_{Vreg}$$

substituting, it follows that:

$$a_{Vreg} = a_V - a_I a_R + b_I b_X$$

$$b_{Vreg} = b_V - a_I b_X - b_I a_R$$

but $$VREG^2 = a_{Vreg}^2 + b_{Vreg}^2$$

and $$V_{RMS} = 0.707 \; VREG$$

where it is customary to define:

$$R = V_R / I_{rated}$$

$$X = V_X / I_{rated}$$

where Irated is the current rating of the voltage regulating transformer.

The manner in which these equations or algorithms can be used to operate voltage regulator 30 become clear once the flow charts representing the software or program are explained. Those skilled in the art will understand that the efficient use of available memory capacity, particularly in a microprocessor which is asked to perform a large number of calculations over a relatively short period of time and to peerform these calculations under real time operating conditions, demands a wise and efficient use of available memory capacity. Thus, to describe in general terms the programming techniques used and to include specific minor subroutines which, more often than not, are dominated by the particular microprocessor being used could be confusing. With these cautions in mind, the flow charts describing the manner in which data is acquired, processed, and used to operate the tap changing motor M (see FIG. 1D) will now be described.

Figures 10, 11:
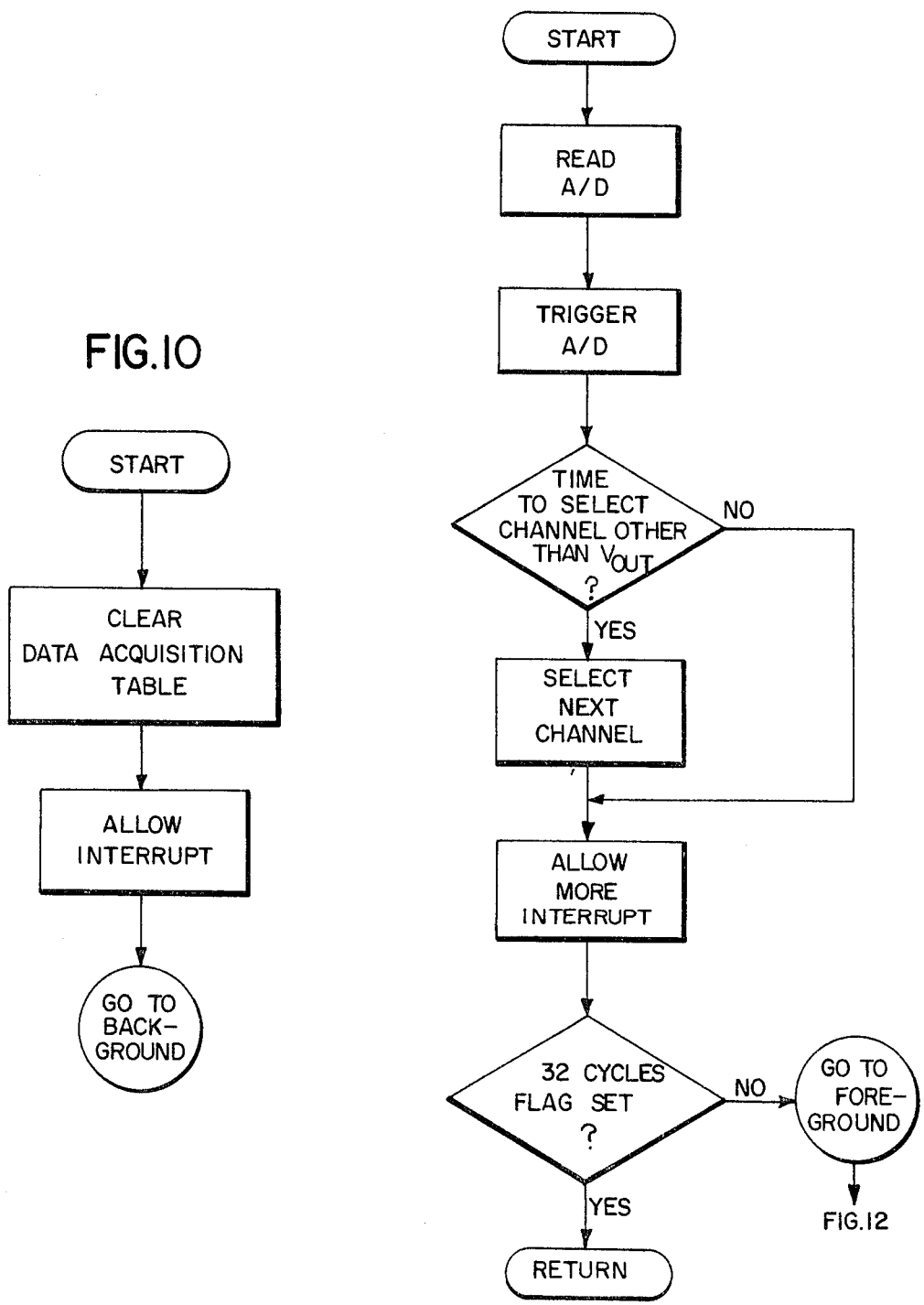

Referring to FIG. 10, once the microprocessor has been placed in operation and the appropriate memory registers are cleared, interrupts are allow to occur as monitored by the MERTOS operating system (see FIG. 7). The interrupt handler begins with the flow chart shown in FIG. 11. Since $V_{out}$ is used as the reference point, the data is collected beginning with the scaled output voltage signal $C_2$ and 32 A.C. cycles of data are obtained for averaging purposes.

Figure 12:
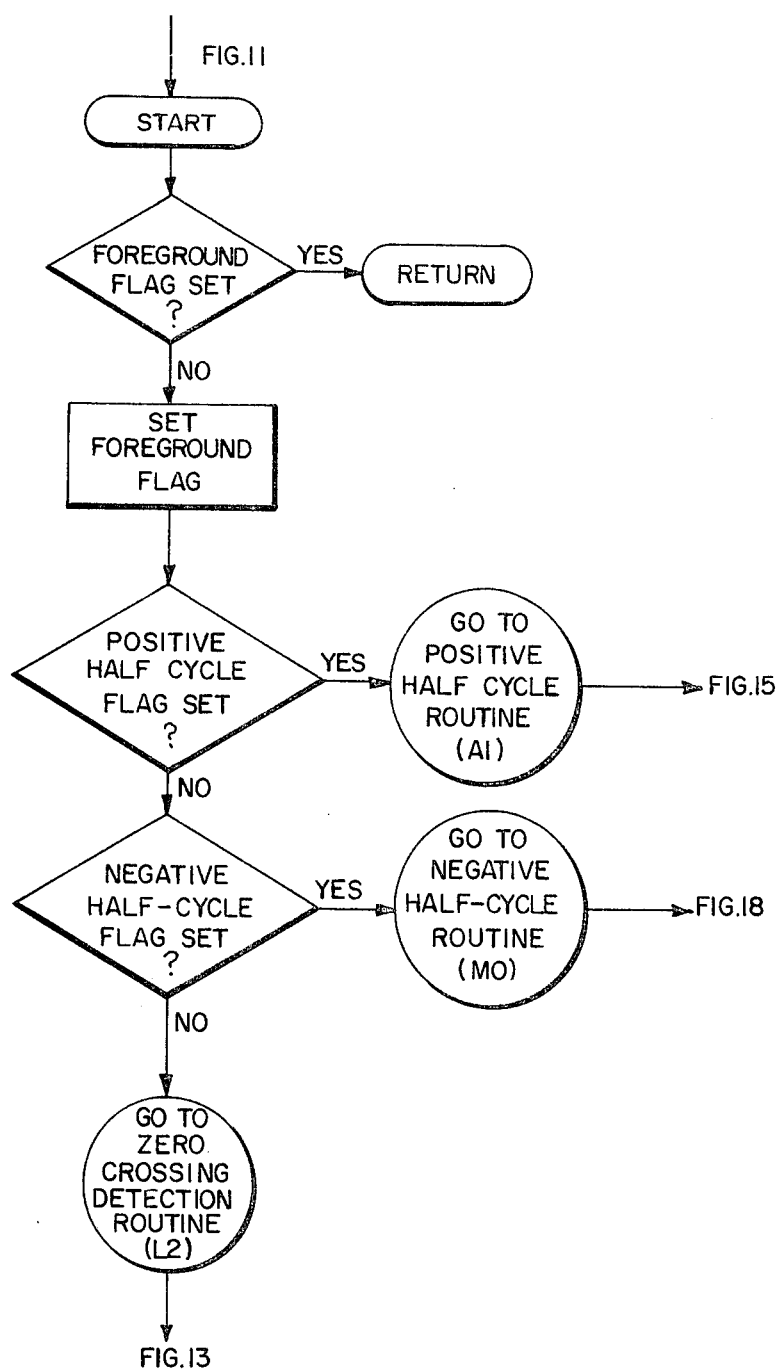
Figure 13:
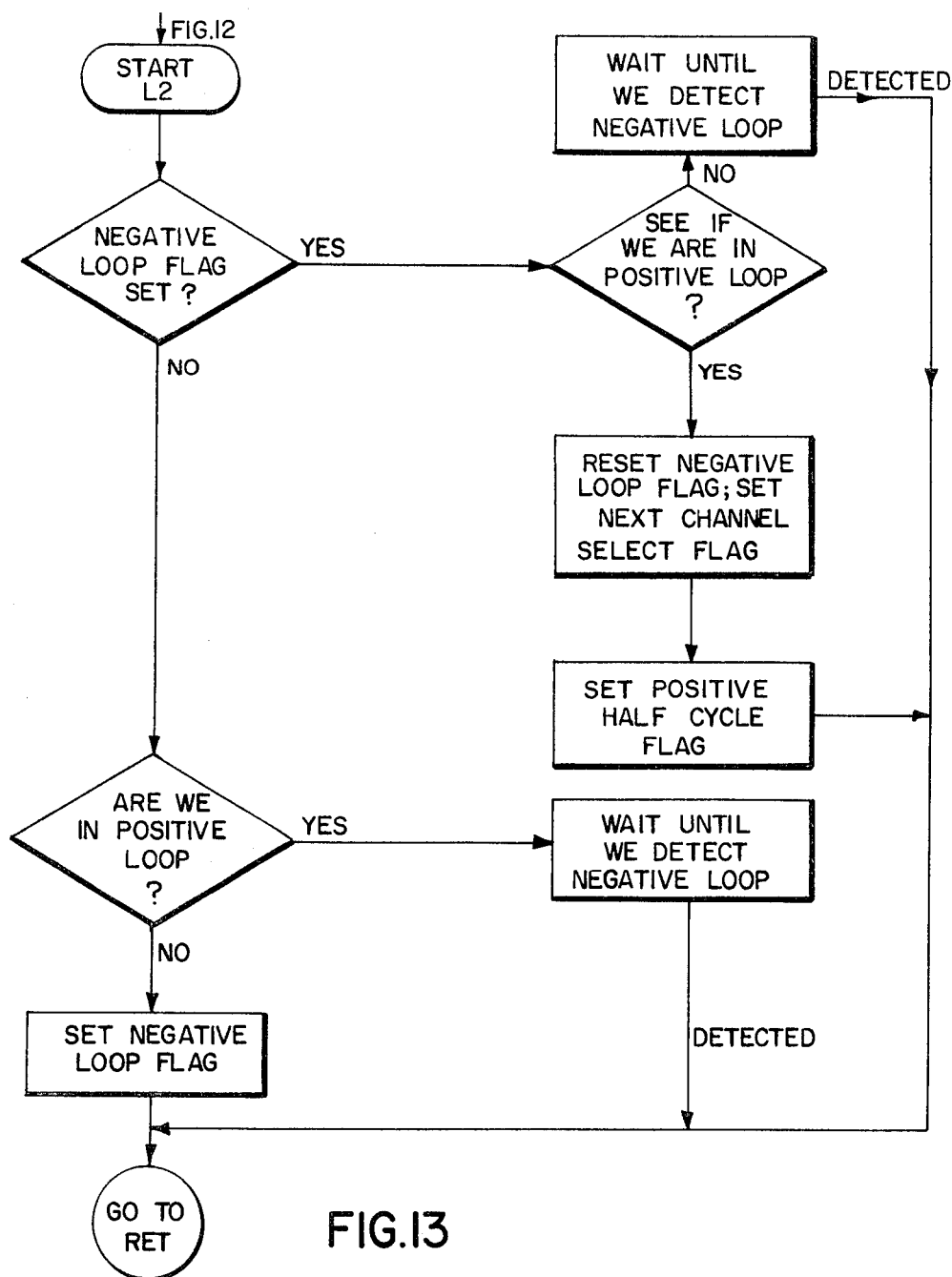
Figure 14:
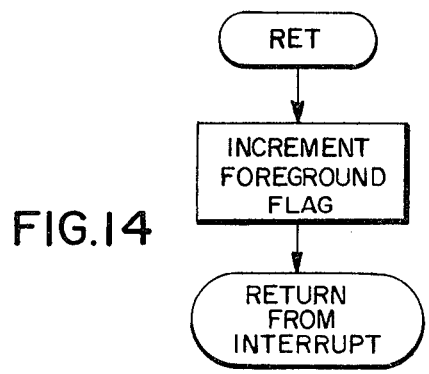
Figure 15:
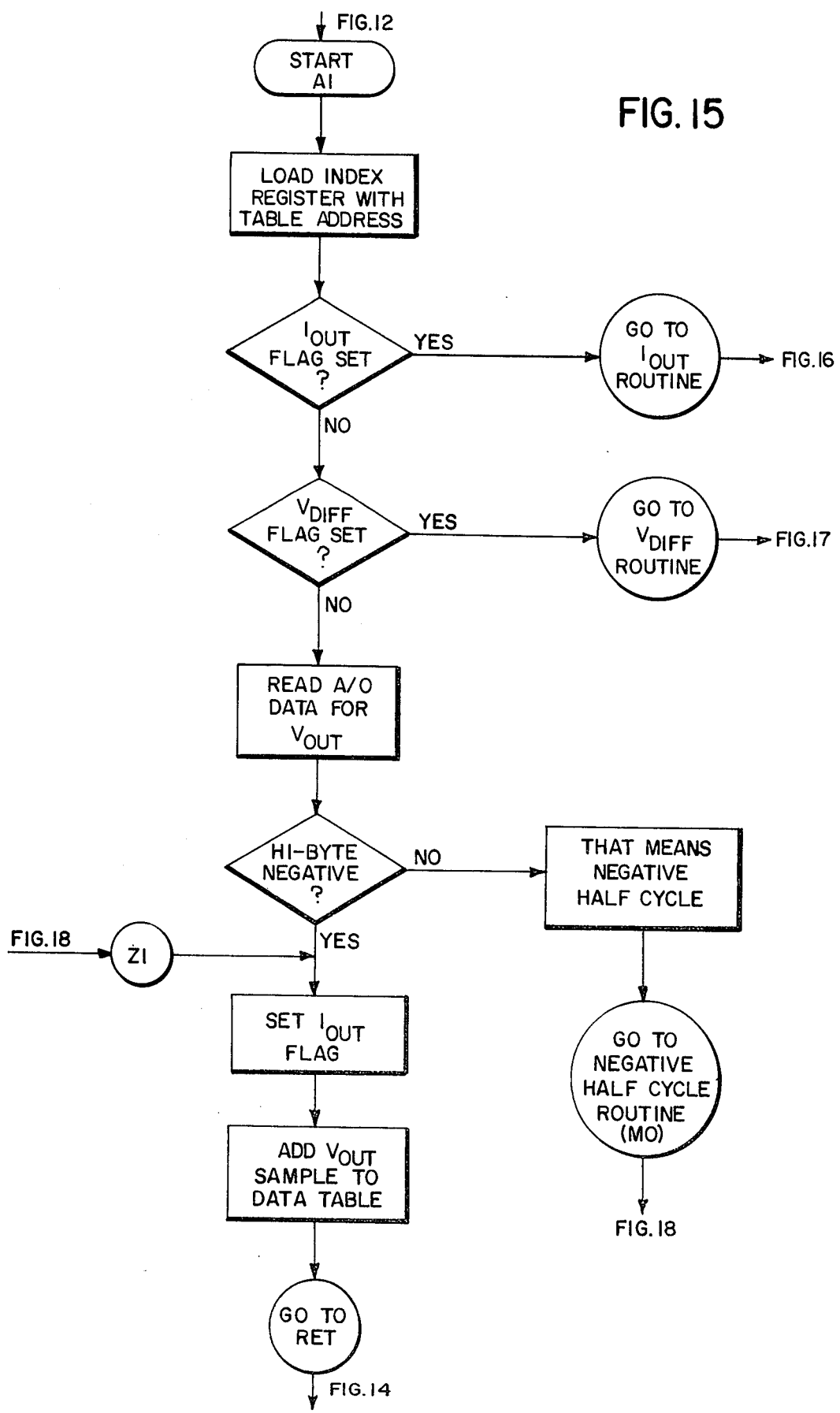
Figure 16:
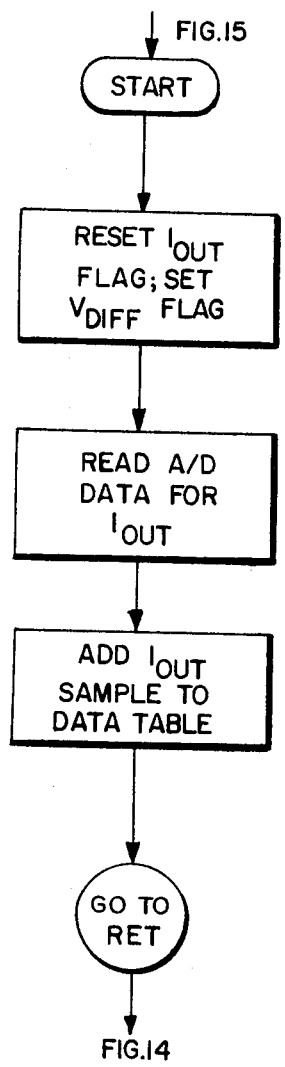
Figure 17:
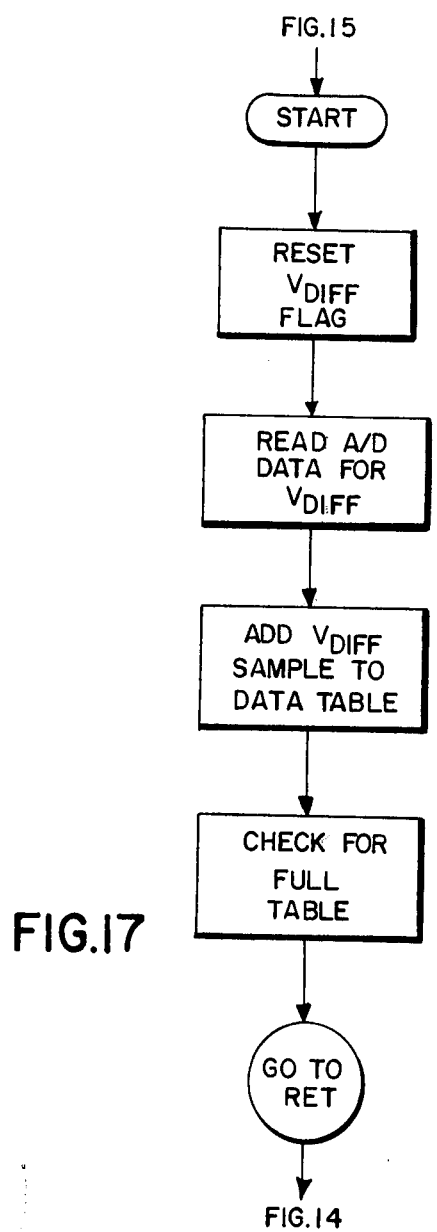
Figure 18:
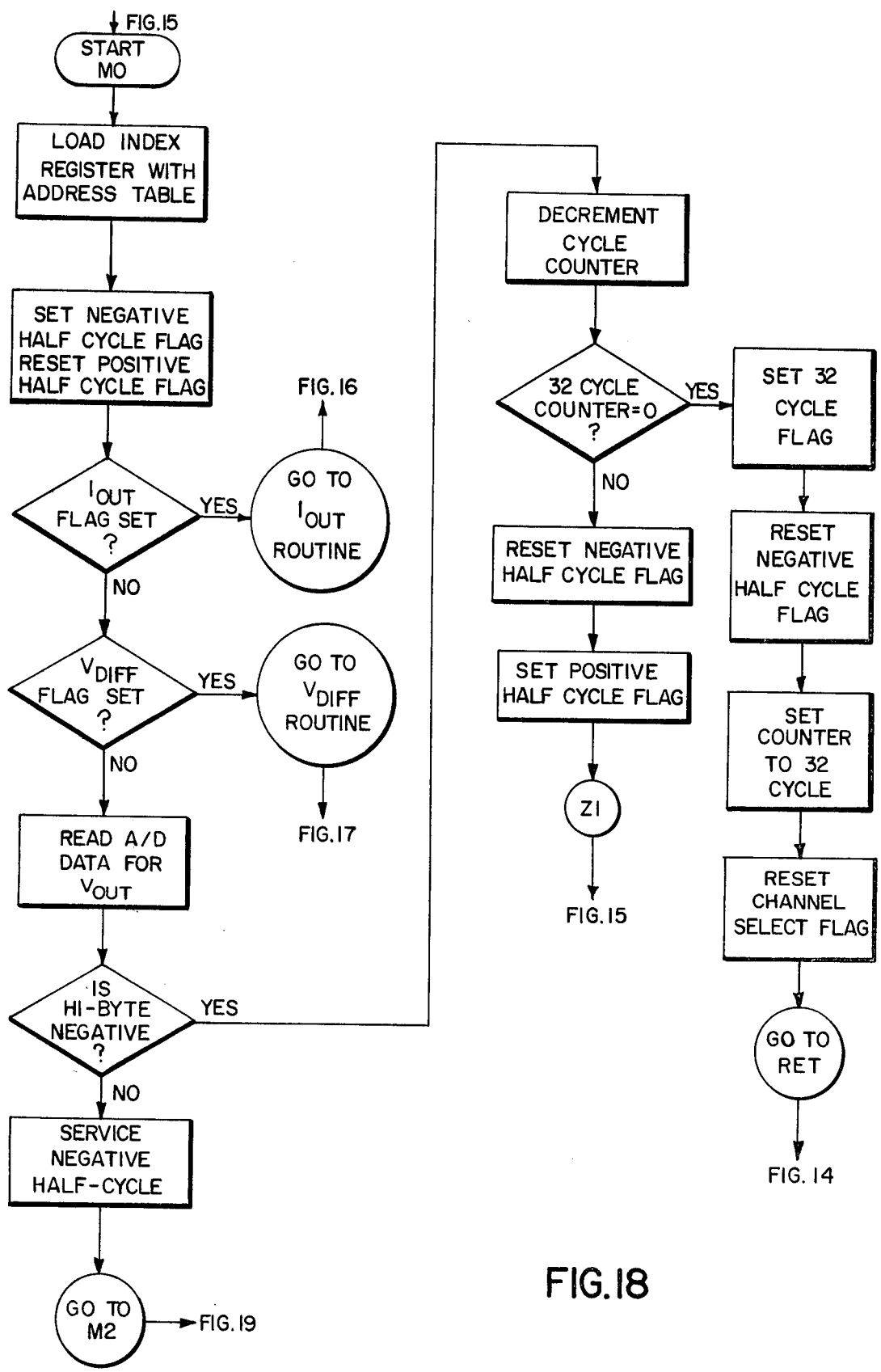
Figure 21:
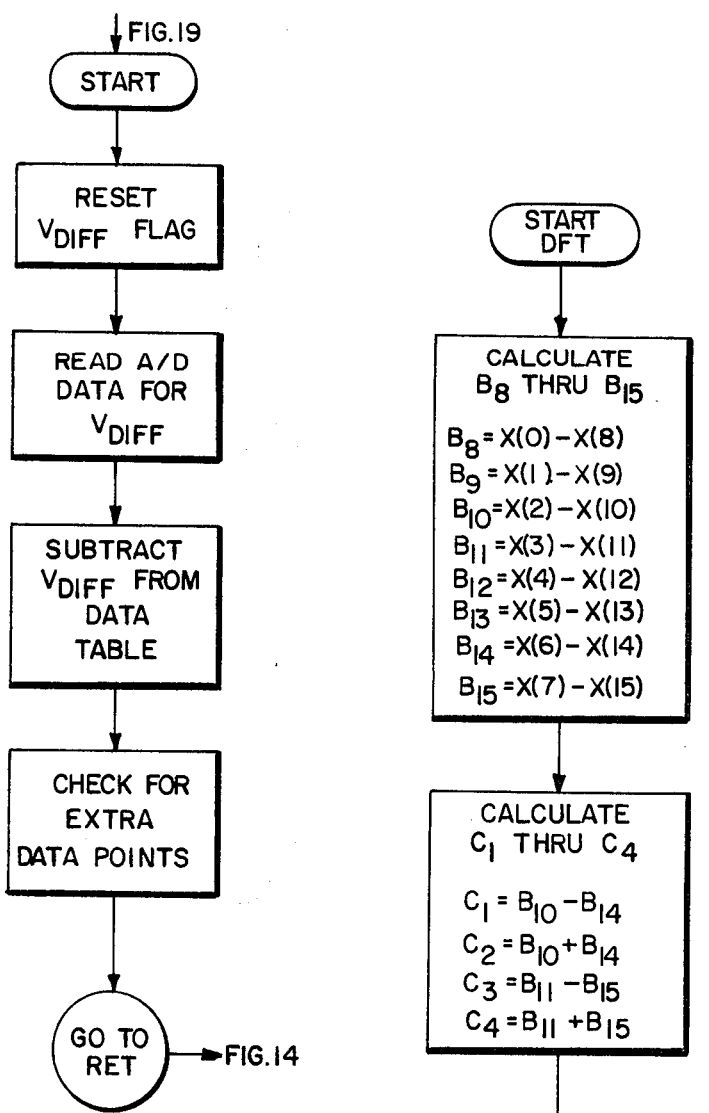

Since a reference or zero line must be established in order to determine the power factor, the cosine of the angular relationship between the current and the voltage, the zero crossing of the alternating current must be determined. FIGS. 12 and 13 describe the flow of data to establish the reference point for subsequent processing. The next time through the flow paths set up by FIG. 12, control will be shifted to the programming steps illustrated in FIG. 15 or FIG. 18. The subroutine shown in FIG. 15 is used on positive half-cycles and the subroutine described on FIG. 18 is used for negative half-cycle data acquisition. The study of these figures will show that the flow paths or subroutines are interactive by establishing appropriate flag settings so that data flows in a smooth and orderly manner without setting up any conflicting flow paths.

A study of FIG. 18 shows that the following sequence is observed. First, voltage at the output terminal $V_O$ is sampled and set into memory. Next, the output current $I_O$ is sampled and registered. Finally, the voltage difference $V_D$ across the input and output terminals of the transformer is measured and set into memory. This is repeated in a sequential order as long as alternating current is provided to the input terminal voltage regulating transformer. Because three quantities are sampled for a total of sixteen samples each, 48 data samples are taken for each A.C. cycle. In other words, there is $7\frac{1}{2}$ electrical degrees between data samples.

Figure 22:
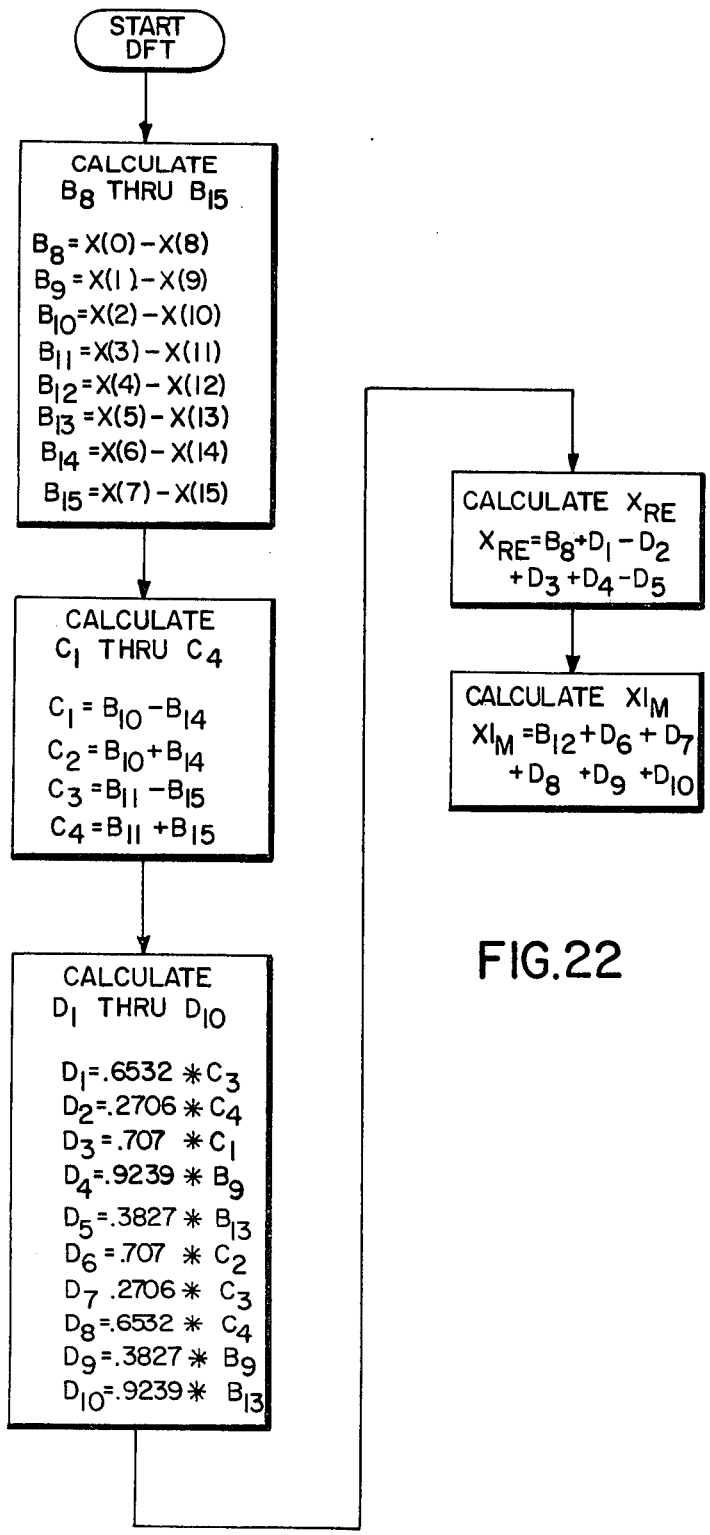

After 32 cycles of alternating current have been sampled, the MERTOS operating system shifts control to the fast Fourier transform subroutine. The data flow for this routine is shown in FIG. 22. By performing a series of additions, subtractions, and multiplications, the real and imaginary components of the sixteen instantaneous samples representative of the electrical parameter are transformed from the time domain to the frequency domain. As previously described, once the real and imaginary components are known, the instantaneous value of the parameter can be calculated as well as the root mean square value. At this point, it should be noted that while the algorithm previously described assumed that only the fundamental frequency was present, it is easy to modify this algorithm to calculate higher harmonics. These harmonics are especially of interest when the voltage regulating transformer is used in connection with silicon control rectifier triggered loads such as capacitor banks. Those skilled in the art know that under these circumstances, it is possible that the direction of power flow through the transformer would not necessarily be determined by merely examining the sign of the product of VI cos $\phi$. This degree of sophistication is not readily implemented by the mere addition of simple hardware components to voltage regulating transformers of conventional design. This again shows the power and versatility of a microprocessor based voltage regulating transformer.

Figure 23:
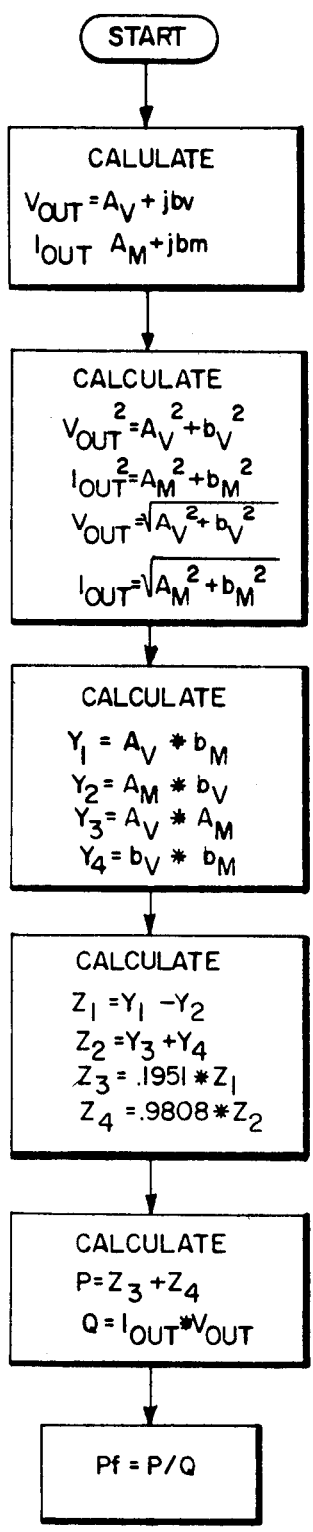

Turning to FIG. 23 and recalling the previous discussion with regard to FIG. 6D, the matter in which the output voltage $V_{out}$ and the output current $I_{out}$ are calculated as shown in FIG. 23. It should be noted that the last four data manipulation blocks in FIG. 23 effectively form the Power Factor Calculation Module 156. It should be noted that the values used in FIG. 23 assume a sample delay angle of $11\frac{1}{4}$ electrical degrees. Since the sign of the power factor is effectively determined by the cosine of the phase angle the sign of the sum of $Z_3+Z_4$ determines the direction of power flow.

Figure 24:
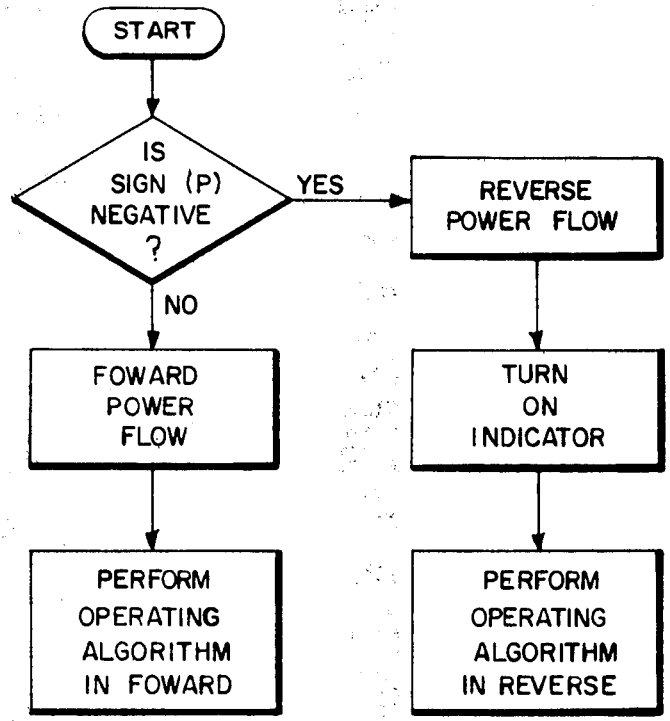
Figure 25:
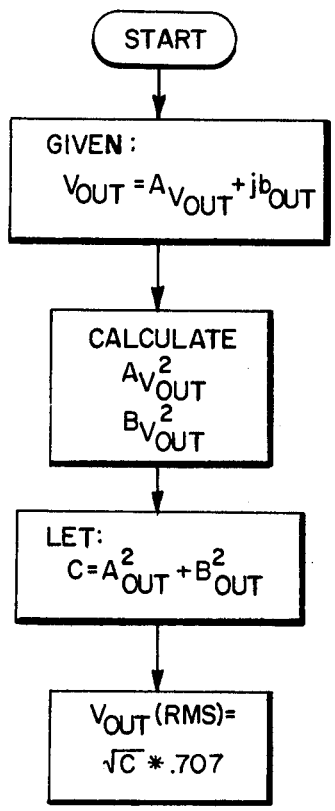

FIG. 24 describes the routine for setting up the manner in which the operating algorithm is established. The subroutine in FIG. 25 is used to calculate the RMS voltage and the output terminals of the transformer.

Figure 26:
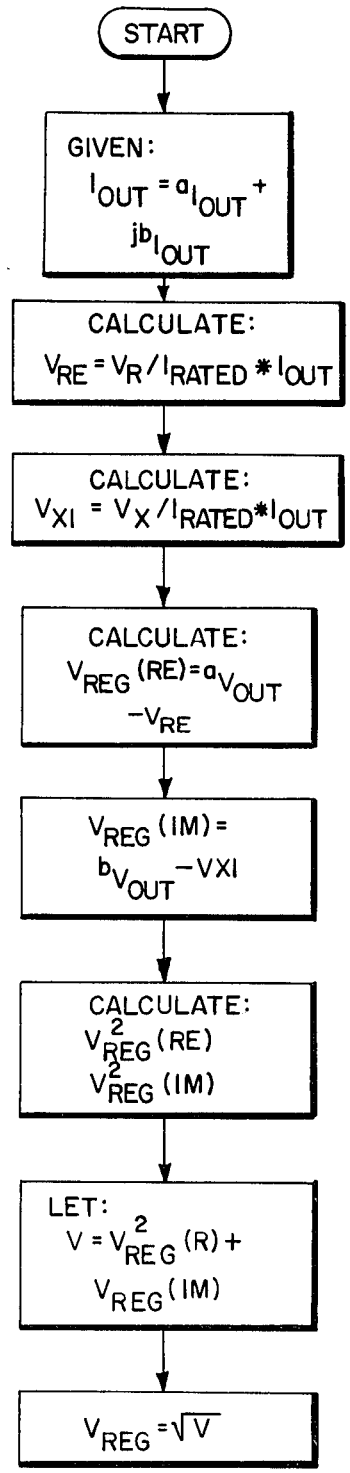

FIG. 26 is a subroutine used to calculate the voltage across the customer's load or VREG. This subroutine effectively takes into account line drop compensation. Those skilled in the art know that line drop compensation may be accomplished by any one of numerous schemes. Many are complicated and involve extensive computer calculations and analysis of the electrical utilities distribution system. It is customary for electrical utilities after performing such analysis to define the line drop by defining a quantity called the "X/R ratio" (i.e. as in the expression $Z=R+jX$). Thus, the line drop or the voltage loss is merely the vector product of $I_{out}$ and $R+jX$ and VREG is equal to $V_{out}$ minus the vector product. Once the real and imaginary parts of VREG are determined, the magnitude of VREG is simply the square root of the sum of the squares of the real and imaginary parts.

Figure 27:
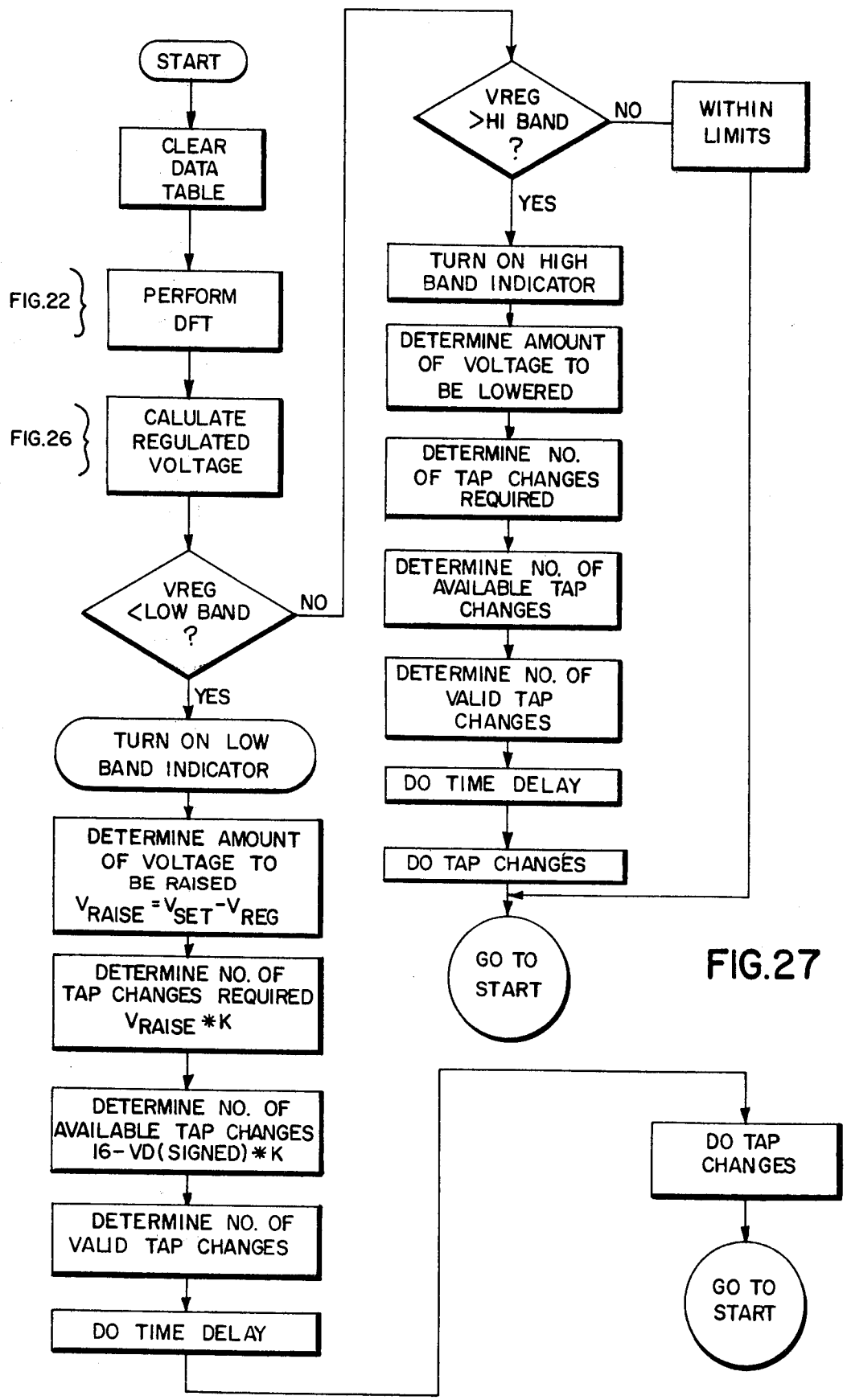

FIG. 27 illustrates the manner in which the voltage difference across the input and output terminals of the transformer are used to control the operation of the tap changing motor M. Once sufficient data has been acquired to perform the DFT calculation, and after the value of VREG has been established (see FIG. 26), a determination is made whether or not the output of voltage at the load (see FIG. 6A) is within the allowable band. Reference values of VREG and Band Width were previously set into the microcomputer control through the keyboard 98 (see FIG. 3E). Of course, if the calculated value of VREG is within limits, the tap changing mechanism does not move.

If the calculated value of VREG drops below the allowable band, the microcomputer determines the amount that the voltage must be raised. In addition, a determination is made of the number of tap changes required to raise the voltage to a value within the allowable band. Since the difference in voltage across the input and output terminals of the transformer is determined by the position of the tap changing mechanism, the value of $V_D$ can be correlated to the actual position of the tap changing mechanism. For example, if there is no difference in voltage, then the tap changing mechanism is in neutral. Of course, it is possible that the calculated value of VREG is so far out of the band that the tap changing motor will be unable to move the tap changing mechanism to a position so as to bring the output voltage to a sufficiently high value to bring VREG within the allowable band. It is in this regard that a determination is made of the number of valid tap changes (i.e. the number of tap changes ordered cannot be greater than the number of tap changes available under the circumstances). In addition, since the voltage regulating transformer should only operate in response to long-term variations in voltage, an appropriate time delay is provided so that tap changing mechanism is not continuously set into motion on every small perturbation in voltage (i.e. instantaneous short term voltage spikes are disregarded). Thus, the magnitude of the difference in voltage across the input and output terminals of the transformer is effectively a determination of the position of the tap changing mechanism. This software determination of tap switch 64 position is in contrast to those voltage regulating transformers which rely upon limit switches and other mechanical devices to provide feedback as to the position of the tap switch 64. This simplified, but nevertheless, deterministic approach adds to the overall versatility and reliability of the control and reduces periodic maintenance.

From the foregoing description, it should be clear that the design of a microprocessor regulating transformer control will evolve as additional features are defined and added to the control scheme. The module concept of MERTOS and application software programs eases the manner in which special features (such as, voltage regulation in the reverse direction—FIG. 24, dynamic load versus temperature operation—FIG. 4A, etc.) are added. The following advantages should be evident:

1. Reliability

Multiple functions can be incorporated in a control by "time-sharing" the resources of the microcomputer. This increases overall reliability by reducing the total number of components. By taking advantage of the commonality of requirements, one proven microcomputer design can be used in all applications. To further enhance reliability, a microcomputer can perform a number of self-checking diagnostics to insure that it is indeed "healthy". In some cases, the microcomputer can be programmed "self-correct" certain internal failures.

2. High "Benefits-To-Cost" Ratio

Some of the same factors which enhance reliability, such as "time-sharing" of resources and using one proven microcomputer design in all applications, also result in a low cost-to-benefit ratio. This is accomplished by keeping the number of parts in a control to a minimum and taking advantage of the cost savings inherent in the high volume production of a single microcomputer module. The benefit-to-cost ratio is futher enhanced by the microcomputer's ability to perform additional and more complex functions for little increase in cost.

3. Accuracy

The microcomputer can perform sophisticated data reduction with high accuracy obtained through repetitive measurements. A desired measurement such as power factor can be obtained indirectly by combining the measurements of several different parameters (i.e. terminal or output voltage and output current). Errors can be minimized by checking for realistic data and operating settings. If necessary, data can be stored in bulk for detailed analysis at some later time. Very accurate timing measurements can also be performed with a microcomputer.

4. Flexibility

Because of modifiable program control, the microprocessor is a very flexible device allowing the functions of a particular control to be readily changed even after the control is installed and in service. A user can tailor a control to the unique needs of his system.

5. Ease of Use

The microcomputer-based control is easy to use with a simple front panel. In addition, a "smart" output display can prompt the operator for additional inputs as well as identify any errors that may occur. Through the use of similar front panels, the time and expense needed to train personnel in the operation of various controls are minimal. The dependability of the operator is also enhanced in that the likelihood of operator error is reduced. Finally, the same simple servicing techniques can be used on all microcomputer-based controls.

6. Adaptability

Forethought in design capitalizes on the inherent flexibility of the microcomputer so controls using them are readily adaptable to new power system requirements. A microcomputer-based control brings to the automated distribution systems of the future the capability of "distributed intelligence". In such a system microprocessor controls communicate with, and are reprogrammed by a central computer, yet operate intelligently and independently in those cases where the central computer is inoperative. A Microcomputer-based control can also be structured and programmed to "supervise" other devices and controls. Thus, the overall reliability of an automated distribution system is enhanced.

7. Other Benefits

Besides enhancing power system reliability, distributed intellignece has other benefits including: minimizing the scope of outages; shortening restoration times; and providing system status at remote locations to a central computer.

All the above features are not necessarily found in a control simply because it uses a microcomputer. Rather, it is because the design is specifically focused to take full advantage of the capabilities of a microcomputer. Thus, an entire family of digital electronic controllers can be developed from the voltage regulating transformer control just described. Controls can be used to operate that switchgear, power capacitors, and LTC transformers. This advance will allow electric utilities to automate their distribution systems and, in their process, improve the systems' efficiency. For example, digital controls can be joined together to form an automated distribution system using dispersed intelligence, where the control is actually located in the distribution apparatus itself. A master substation computer would be used to send signals automatically throughout the distribution system to the electronically controlled equipment. During an electrical outage, computer controlled switchgear can be used to: automatically isolate the fault to the smallest possible area; determine its severity; and make system changes designed to restore power as quickly as possible. Voltage Regulating Transformers then could be automatically reset to a voltage reduction mode and power factor capacitors adjusted to optimize the available generating capacity. Such an automated distribution system will undoubtedly form the next generation of protective and control systems for electrical utility distribution system operations.

From the foregoing, it will be observed that there are many numerous variations and modifications which may be effected without departing from the true spirit and scope of the novel concept of the invention. Thus, it is to be understood that no limitation with respect to the specific embodiments illustrated is intended or should be referred. It is, of course, intended to cover by the intended claims all such modifications as fall within the scope of the claims.

What is claimed is as follows:
1. A voltage regulating transformer, comprising:
   a. a first winding defining a first plurality of turns and having an associated input terminal adapted to be connected to a source of A.C. voltage;

b. a second winding, electromagnetically coupled to said first winding, defining a second plurality of turns and having an associated output terminal;

c. changer means, operated in response to an analog control signal supplied thereto, for changing the ratio of turns through which current flows through said first winding and said second winding, whereby the voltage at said output terminal varies in response to said analog control signal when A.C. voltage is applied to said input terminal;

d. voltage output signaling means, operatively connected to said output terminal, for producing a plurality of digital voltage signals representative of the instantaneous A.C. voltage at said output terminal;

e. digital input means for producing a reference digital voltage signal representative of the RMS voltage to be maintained at said output terminal over the period of said A.C. voltage;

f. digital computer means having a single microprocessor for Fast Fourier Transforming said plurality of digital voltage signals from the time domain into the frequency domain to obtain a measured digital voltage signal representative of the RMS voltage at said output terminal over the period of said A.C. voltage and for generating a digital control signal representative of the difference between said measured digital voltage signal and said reference digital voltage signal; and g. converter means for converting said digital control signals to an analog control signal to operate said changer means, whereby said changer means is operated in response to the RMS voltage at said output terminal over the period of the A.C. voltage applied to said input terminal.

2. The voltage regulating transformer set forth in claim 1, further including:

a. current output signaling means, operatively connected to said output terminal, for producing a plurality of digital current signals representative of the instantaneous A.C. current flowing through said output terminal, said digital current signals being separated in time from said digital voltage signals;

b. means, included within said digital computer means, for Fast Fourier Transforming said plurality of digital current signals from the time domain into the frequency domain to obtain a measured digital current signal representative of the RMS current flowing through said output terminal over said period and corresponding to said measured digital voltage signal; and c. means, included within said digital computer means, for processing said measured digital signals of current and voltage to produce a digital signal representative of the phase angle relationship of said instantaneous A.C. voltage and said instantaneous current at said output terminal over said period, whereby the power factor relationship between said instantaneous current and voltage is established.

3. The voltage regulating transformer set forth in claim 1, further including:

a. current output signaling means, operatively connected to said output terminal, for producing a plurality of digital current signals representative of the instantaneous A.C. current flowing through said output terminal, said digital current signals being separated in time from said digital voltage signals;

b. means, included within said digital computer means, for Fast Fourier Transforming said plurality of digital current signals from the time domain into the frequency domain to obtain a measured digital current signal representative of the RMS current flowing through said output terminal over said period and corresponding to said measured digital voltage signal; and c. means, included within said digital computer means, for processing said measured digital signals of current and voltage to produce a digital signal representative of the product of:
  1. said instantaneous A.C. voltage;
  2. said instantaneous current; and
  3. the cosine of the phase angle relationship of said instantaneous A.C. voltage and said instantaneous current, whereby the direction of power flow across said first winding and said second winding is established.

4. The voltage regulating transformer set forth in claim 2, wherein: said single microprocessor has a plurality of digital registers for storing digital signals including said measured digital current and voltage signals and the power factor relationship between said current and voltage, and a digital I/O means for addressing and displaying the contents of said registers scaled to read RMS current and RMS voltage at said output terminal and said power factor.

5. The voltage regulating transformer set forth in claim 4,
further including asynchronous communications interface means for addressing and displaying the contents of said registers and for serially transmitting the data therein to locations remote from the voltage regulating transformer.

6. The voltage regulating transformer set forth in claim 2, wherein said plurality of digital current signals and said plurality of digital voltage signals are cyclically and sequentially produced by said current output means and said voltage output means, each digital current signal having an associated digital voltage signal displaced in time by the amount of the phase angle relationship between the voltage and the current and by the interval between successive measurements of voltage and current by said current output means and said voltage output means.

7. The voltage regulating transformer set forth in claim 1, wherein said digital computer means includes accumulator means for adding a plurality of said measured digital voltage signals over a plurality of periods of said A.C. voltage to obtain a digital control signal suitable for driving said converter means, whereby said changer means operates in response to the RMS voltage at said output terminals over a long period of time relative to the period of said A.C. voltage.

8. The voltage regulating transformer set forth in claim 2, further including: differential voltage signaling means, operatively connected to said input and output terminals, for producing a plurality of digital differential voltage signals representative of the instantaneous voltage difference across said input and output terminals over the period of said A.C. voltage, said digital differential voltage signals being separated in time from said digital voltage signals and said digital current signals; and wherein one of said windings defines a plurality of voltage taps, wherein said changer means includes a positionable tap changing means movable between successive voltage taps; and wherein said digital computer means includes:

a. means for Fast Fourier Transforming said plurality of digital differential voltage signals from the time domain into the frequency domain to obtain a measured digital differential voltage signal representative of the RMS voltage difference between input and output terminals; and b. means for processing said measured differential digital signal to produce a digital control signal representative of the relative position of said tap changing means.

9. The voltage regulating transformer set forth in claim 1, wherein said output terminal is adapted to be connected to an A.C. load using power transmission lines characterized by a predetermined value of electrical impedance; and further including:

a. current output signaling means, operatively connected to said output terminal, for producing a plurality of digital current signals representative of the instantaneous A.C. current flowing through said output terminal, said digital current signals being separated in time from said digital voltage signals;

b. means, included within said digital computer means, for Fast Fourier Transforming said plurality of digital current signals from the time domain into the frequency domain to obtain a measured digital current signal representative of the RMS current flowing through said output terminal over said period and corresponding to said measured digital voltage signal;

c. means, includes within said digital input means, for producing a reference digital voltage signal representative of the RMS voltage to be maintained at said load; and d. means, included within said digital computer means, for processing said measured digital signals of current and voltage, said RMS load voltage, and said impedance to produce a digital control signal representative of the RMS voltage to be maintained at said output terminal over the period of said A.C. voltage and suitable for operating said changer means through said convertor means, whereby said changer means operates to control the voltage at said load while compensating for the line drop induced by said impedance.

10. The voltage regulating transformer set forth in claim 2, further including:

a. voltage differential signaling means, operatively connected to said input and output terminals, for producing a plurality of digital differential voltage signals representative of the instantaneous A.C. voltage difference between said input terminal and said output terminal, said digital differential voltage signals being separated in time from said digital voltage signals and said digital current signals; and b. means, included within said digital computer means, for Fast Fourier Transforming said plurality of digital differential voltage signals from the time domain into the frequency domain to obtain a measured digital differential voltage signal representative of the RMS voltage difference between said input terminal and said output terminal; and wherein said changer means includes a multiposition electrical switch;

wherein one of said first winding and second winding defines a plurality of voltage taps adapted to be connected in sequence to said switch and the associated one of said input and output terminals, whereby the voltage at said output terminal varies in response to the position of said switch when A.C. voltage is applied to said input terminal; and wherein said digital computer means includes means for storing a plurality of reference digital differential voltage signals representative of the instantaneous A.C. voltage difference between said input terminal and output terminals corresponding to the positions of said switch, whereby the position of said switch is correlated to said digital differential digital voltage signals.

11. The voltage regulating transformer set forth in claim 10, wherein said switch is positioned by an electrical motor, the direction of rotation of which is controled by the direction of current flow through said motor;

further including:

a. motor current signaling means for producing a plurality of measured digital motor current signals representative of the current flowing through said motor;

b. timing means for producing a plurality of digital time signals representative of the time interval through which said current flows through said motor;

c. table means, within said digital computer means, for storing a table of reference digital motor current signals corresponding the current flowing through said motor in the time interval during which said motor moves said switch between said taps; and d. comparison means, included within said digital computer means, for comparing said table of reference digital motor current signals to said measured digital motor current signal and said digital time signals and for producing a digital error signal representative of the deviation between said measured signals and said table of signals, whereby the operating characteristics of said motor in moving said switch is monitored by said digital computer means.

12. The voltage regulating transformer set forth in claim 1, further including: isolation means, electrically interposed between said output terminal and said voltage output signaling means, for electrically isolating said second winding from said voltage output signaling means.

13. The voltage regulating transformer set forth in claim 1, further including:

a. interval timer means, triggered into operation when said measured digital voltage signal differs from said reference digital voltage signal more than a predetermined difference, for measuring time in multiples of said AC voltage period; and b. register means, included within said digital computer means, for storing a plurality of digital signals including a first digital signal representative of said predetermined voltage difference, and a second digital signal representative of the difference between said measured digital voltage signal and said reference digital voltage signal after a time interval equal to a preset multiple of A.C. voltage periods, said second digital signal forming said digital control signal to drive said convertor means, whereby said changer means operates in response to long-term variations in the RMS voltage at said output terminal over the RMS voltage represented by said reference digital voltage signal relative to the period of said AC voltage.

14. The voltage regulating transformer set forth in claim 11, further including indication means, operated in response to said comparison means, for indicating that said measured signals deviate from said table of digital signals.

15. The voltage regulating transformer set forth in claim 1, further including: frequency monitoring means, included within said digital computer means, for monitoring the electrical frequency at said output terminal and for generating a digital signal representative of calendar time, whereby digital signals within said digital computer means are historically related to one another.

16. A voltage regulator, comprising:
 a. a first winding, a second winding with one of said first and second windings having a plurality of voltage taps, a set of input terminals adapted to be connected to a source of A.C. voltage, and a set of output terminals adapted to be connected to a load impedance;
 b. tap changing means, operated in response to a control signal supplied thereto, for electrically and selectively connecting one of said input and output terminals to one of said plurality of voltage taps, whereby the voltage across said output terminals varies in response to said control signal when A.C. voltage is supplied to said input terminals;
 c. a plurality of response means, associated with said input and output terminals, for generating digital signals representative of the electrical conditions at said input and output terminals
 d. a digital processor including a single microprocessor, memory means for storing digital signals, and program means for programming said processor and for Fast Fourier Transforming selected digital signals within said memory means to produce a first digital signal representative of the RMS voltage at said output terminals;
 e. display means, for selectively presenting digitally processed information and for inserting reference digital signals into said memory means including a reference RMS digital voltage signal;
 f. sequencing means, operatively connected to the processor, for cyclically and sequentially enabling each of said response means to signal said processor as to the electrical conditions at said input and output terminals;
 g. non-volatile storage means, operatively connected to said processor, for storing digital signals from said memory means as enabled by said sequencing means;
 h. means for producing a second digital central signal representative of the difference between said reference RMS digital voltage signal and said first digital signal; and
 i. control means for converting said second digital control signal to a control signal suitable for operating said tap changing means, whereby said tap changing means is operated in response to digitally processed signals representative of the RMS voltage.

17. The voltage regulator set forth in claim 16, wherein:
 said first winding and said second winding are submerged in a dielectric fluid;
 said plurality of response means includes means for supplying digital signals to said processor representative of the thermodynamic state of said dielectric fluid, and
 said display means includes means for inserting into said memory means reference dielectric digital signals representative of the thermodynamic state of said dielectric fluid when said voltage regulator is operating to produce a preselected RMS voltage and current at said output terminals; and further including means for producing a third digital control signal representative of the difference between said reference dielectric digital signals and said digital signals representative of the thermodynamic state of said dielectric fluid, whereby said third digital control signal is a measure of the loading of said voltage regulator.

18. In a transformer producing at an output terminal an output voltage from an input A.C. voltage supplied to an input terminal by using a transformer winding which defines a plurality of voltage taps and by using a motor driven switch which electrically connects one of the input and output terminals and one of the plurality of voltage taps, a method of regulating the output voltage, comprising of steps of:
 a. pre-selecting the RMS output voltage to be maintained at said output terminal;
 b. initiating a timer for monitoring elapsed time over uniformly spaced apart time intervals;
 c. digitally sampling the instantaneous output voltage at fixed intervals over a plurality of A.C. cycle periods of the current flowing out of said output terminal so as to obtain a plurality of instantaneous digital voltage samples;
 d. Fast Fourier transforming said plurality of voltage samples to a digital signal which is a function of frequency of said A.C. current, whereby the RMS output voltage over a plurality of said A.C. cycle periods is determined;
 e. digitally comparing said pre-selected voltage RMS output and the RMS output voltage over said plurality of A.C. cycle periods so as to obtain the sign and the magnitude of the difference between said pre-selected RMS output voltage and said RMS output voltage over said plurality of A.C. cycle periods; and
 f. energizing said motor driven switch to change the position of said switch from the one voltage tap to another using the sign of the difference between said voltages so as to reduce the difference between said pre-selected RMS output voltage and said RMS output voltage over said plurality of A.C. cycle periods.

19. The method set forth in claim 18, further including the steps of:
 a. digitally sampling the instantaneous output current at fixed intervals over a plurality A.C. cycle periods of the current flowing out of said output terminal so as to obtain a plurality of instantaneous digital current samples, said plurality of instantaneous digital current samples being obtained in sequence relative to said plurality of instantaneous digital voltage samples, such that for each voltage sample there is an associated current sample;

b. Fast Fourier transforming said plurality of digital current samples to a digital signal current which is a function of said A.C. cycle period, whereby the RMS output current over a plurality of A.C. cycle periods is determined;

c. using said timer to measure the difference in time between corresponding current samples and voltage samples;

d. using said time difference and the frequency of said A.C. voltage, digitally calculating the angular difference between corresponding current and voltage samples;

e. using said angular difference and said RMS values of voltage and current, digitally calculating the phase angle difference between the instantaneous output current over said A.C. cycle period and the instantaneous output voltage over said A.C. cycle period; and f. digitally calculating the cosine of the phase angle between said instantaneous output voltage value and said instantaneous output current value, whereby a digital value is obtained representative of the power factor of the A.C. current flowing out of said output terminal.

20. A voltage regulating transformer, comprising:

a. A first winding defining a first plurality of turns and having an associated input terminal adapted to be connected to a source of A.C. voltage;

b. a second winding, electromagnetically coupled to said first winding, defining a second plurality of turns and having an associated output terminal, one of said first and second windings defining a plurality of voltage taps;

c. tap changer means, operated in response to an analog control signal supplied thereto, for changing the ratio of turns through which current flows through said one winding relative to said second winding, whereby the voltage at said output terminal varies in response to said analog control signal when A.C. voltage is applied to said input terminal;

d. voltage output signaling means, operatively connected to said output terminal, for producing a plurality of digital voltage signals representative of the instantaneous A.C. voltage at said output terminal;

e. digital input means for producing a reference digital voltage signal representative of the RMS voltage to be maintained at said output terminal over the period of said A.C. voltage;

f. current output signaling means, operatively connected to said output terminal, for producing a plurality of digital current signals representative of the instantaneous A.C. current flowing through said output terminal;

g. a digital computer;

h. means, within said digital computer, for transforming said plurality of digital voltage signals from the time domain into the frequency domain to obtain a measured digital voltage signal representative of the RMS voltage at said output terminal over the period of said A.C. voltage and for generating a digital control signal representative of the difference between said measured digital voltage signal and said reference digital voltage signal;

i. means, included within said digital computer, for transforming said plurality of digital current signals from the time domain into the frequency domain to obtain a measured digital current signal representative of the RMS current flowing through said output terminal over said period and corresponding to said measured digital voltage signal;

j. means, included within said digital computer, for processing said measured digital signals of current and voltage to produce a digital signal representative of the phase angle relationship of said instantaneous A.C. voltage and said instantaneous current at said output terminal over said period, whereby the power factor relationship between said instantaneous current and voltage is established;

k. converter means for converting said digital control signal to an analog control signal to operate said tap changer means, whereby said tap changer means is operated in response to the RMS voltage at said output terminal over the period of the A.C. voltage applied to said input terminal;

l. differential voltage signaling means operatively connected to said input and output terminals, for producing a plurality of digital differential voltage signals representative of the instantaneous voltage difference across said input and output terminals over the period of said A.C. voltage;

m. means, included within said digital computer, for transforming said plurality of digital differential voltage signals from the time domain into the frequency domain to obtain a measured digital differential voltage signal representative of the RMS voltage difference between input and output terminals; and n. means for processing said measured differential digital signal to produce a digital control signal representative of the relative position of said tap changing means.

21. A voltage regulating transformer, comprising:

a. a first winding defining a first plurality of turns and having an associated input terminal adapted to be connected to a source of A.C. voltage;

b. a second winding, electromagnetically coupled to said first winding, defining a second plurality of turns and having an associated output terminal;

c. multiple position switch means, operated in response to an analog control signal supplied thereto, for changing the ratio of turns through which current flows through said first winding and said second winding, one of said first winding and second winding defines a plurality of voltage taps adapted to be connected in sequence to said switch and the associated one of said input and output terminals, whereby the voltage at said output terminal varies in response to the position of said swtich when A.C. voltage is applied to said input terminal;

d. voltage output signaling means, operatively connected to said output terminal, for producing a plurality of digital voltage signals representative of the instantaneous A.C. voltage at said output terminal;

e. digital input means for producing reference digital voltage signals representative of the RMS voltage to be maintained at said output terminal over the period of said A.C. voltage;

f. current output signaling means, operatively connected to said output terminal, for producing a plurality of digital current signals representative of the instantaneous A.C. current flowing through said output terminal;

g. voltage differential signaling means, operatively connected to said input and output terminals, for producing a plurality of digital differential voltage signals representative of the instantaneous A.C. voltage difference between said input terminal and said output terminal;

h. digital computer means for digital computation of digital signals supplied thereto;

i. means, within said digital computer means, for transforming said plurality of digital voltage signals from the time domain into the frequency domain to obtain a measured digital voltage signal representative of the RMS voltage at said output terminal over the period of said A.C. voltage and for generating a digital control signal representative of the difference between said measured digital voltage signal and said reference digital voltage signal;

j. means, within said digital computer means, for transforming said plurality of digital current signals from the time domain into the frequency domain to obtain a measured digital current signal representative of the RMS current flowing through said output terminal over said period and corresponding to said meansured digital voltage signal;

k. means, within said digital computer means, for processing said meansured digital signals of current and voltage to produce a digital signal representative of the phase angle relationship of said instantaneous A.C. voltage and said instantaneous current at said output terminal over said period, whereby the power factor relationship between said instantaneous current and voltage is established.

l. means, withing said digital computer means, for transforming said plurality of digital differential voltage signals from the time domain into the frequency domain to obtain a measured digital differential voltage signal representative of the RMS voltage difference between said input terminal and said output terminal;

m. converter means for converting said digital control signals to an analog control signal to operate said changer means, whereby said changer means is operated in response to the RMS voltage at said output terminal over the period of the A.C. voltage applied to said input terminal; and n. means, within said digital computer means, for storing a plurality of reference digital differential voltage signals representative of the instantaneous A.C. voltage difference between said input terminal and output terminals corresponding to the positions of said swtich, whereby the position of said switch is correlated to said digital differential digital voltage signals.

22. A voltage regulating transformer, comprising:

a. a first winding defining a first plurality of turns and having an associated input terminal adapted to be connected to a source of A.C. voltage;

b. a second winding, electromagnetically coupled to said first winding, defining a second plurality of turns and having an associated output terminal, said output terminal being adapted to be connected to an A.C. load using power transmission lines which are characterized by a predetermined value of electrical impedance;

c. current output signaling means, operatively connected to said output terminal for producing a plurality of digital current signals representative of the instantaneous A.C. current flowing through said output terminal;

d. changing means, operated in response to an analog control signal supplied thereto, for changing the ratio of turns through which current flows through said first winding and said second winding, whereby the voltage at said output terminal varies in response to said analog control signal when A.C. voltage is applied to said input terminal;

e. voltage output signaling means, operatively connected to said output terminal, for producing a plurality of digital voltage signals representative of the instantaneous A.C. voltage at said output terminal;

f. digital input means for producing a reference digital voltage signal representative of the RMS voltage to be maintained at said output terminal over the period of said A.C. voltage and for producing a reference digital voltage signal representative of the RMS voltage to be maintained at said load;

g. a digital computer;

h. means, within said computer, for transforming said plurality of digital voltage signals from the time domain into the frequency domain to obtain a measured digital voltage signal representative of the RMS voltage at said output terminal over the period of said A.C. voltage and for generating a digital control signal representative of the differnece between said meansured digital voltage signal and said reference digital voltage signal;

i. means, within said digital computer, for transforming said plurality of digital current signals from the time domain into the frequency domain to obtain a measured digital current signal representative of the RMS current flowing through said output terminal over said period and corresponding to said measured digital voltage signal;

j. processing means, within said digital computer, for processing said measured digital signals of current and voltage, said RMS load voltage, and said impedance to produce a digital control signal representative of the RMS voltage to be maintained at said output terminal over the period of said A.C. voltage and suitable for operating said changer means; and k. converter means for converting said digital control signals to an analog control signal to operate said changer means, whereby said changer means operates to control the voltage at said load while compensating for the line drop induced by said impedance.

23. A voltage regulating transformer, comprising:

a. a first winding defining a first plurality of turns and having an associated input terminal adapted to be connected to a source of A.C. voltage;

b. a second winding, to electromagnetically coupled to said first winding, defining a second plurality of turns and having an associated output terminal;

c. changer means, operated in response to an analog control signal supplied thereto, for changing the ratio of turns through which current flows through said first winding and said second winding, whereby the voltage at said output terminal varies in response to said analog control signal when A.C. voltage is applied to said input terminal;

d. voltage output signaling means, operatively connected to said output terminal, for producing a plurality of digital voltage signals representative of the instantaneous A.C. voltage at said output terminal;

e. digital input means for producing a reference digital voltage signal representative of the RMS voltage to be maintained at said output terminal over the period of said A.C. voltage;

f. digital computer means including means for transforming said plurality of digital voltage signals from the time domain into the frequency domain to obtain a measured digital voltage signal representative of the RMS voltage at said output terminal over the period of said A.C. voltage and for generating a digital control signal representative of the difference between said measured digital voltage signal and said reference digital voltage signal;

g. interval timer means, triggered into operation when said measured digital voltage signal differes from said reference digital voltage signal more than a predetermined difference, for measuring time in multiples of said A.C. voltage period;

h. register means, included within said digital computer means, for storing a plurality of digital signals including a first digital signal representative of said predetermined voltage difference, and a second digital signal representative of the difference between said measured digital voltage signal and said reference digital voltage signal after a time interval equal to a preset multiple of A.C. voltage periods; and i. converter means for converting said second digital control signal to an analog control signal to operate said changer means, whereby said changer means operates in response to long-term variations in the RMS voltage at said output terminal over the RMS voltage represented by said reference digital voltage signal relative to the period of said A.C. voltage.

* * * * *